US010648316B2

(12) United States Patent
Wilson et al.

(10) Patent No.: US 10,648,316 B2
(45) Date of Patent: May 12, 2020

(54) FORMATION CHARACTERISTICS DETERMINATION APPARATUS, METHODS, AND SYSTEMS

(71) Applicant: Halliburton Energy Services, Inc., Houston, TX (US)

(72) Inventors: Glenn A. Wilson, Singapore (SG); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 236 days.

(21) Appl. No.: 15/315,242

(22) PCT Filed: Jan. 6, 2015

(86) PCT No.: PCT/US2015/010281
§ 371 (c)(1),
(2) Date: Nov. 30, 2016

(87) PCT Pub. No.: WO2016/111678
PCT Pub. Date: Jul. 14, 2016

(65) Prior Publication Data
US 2017/0096887 A1   Apr. 6, 2017

(51) Int. Cl.
*E21B 44/00* (2006.01)
*G01V 3/38* (2006.01)
(Continued)

(52) U.S. Cl.
CPC ............... *E21B 44/00* (2013.01); *E21B 7/04* (2013.01); *E21B 49/00* (2013.01); *G01V 3/30* (2013.01);
(Continued)

(58) Field of Classification Search
USPC ........................................... 703/10, 2
See application file for complete search history.

(56) References Cited

U.S. PATENT DOCUMENTS 5,157,605 A * 10/1992 Chandler ............... G01V 3/28
324/335
5,703,773 A * 12/1997 Tabarovsky ............ G01V 3/28
702/11

(Continued)

FOREIGN PATENT DOCUMENTS

WO    2014004815 A1    1/2014

OTHER PUBLICATIONS

Sharma et al. ("Inversion of Electrical Resistivity Data: A Review", Geological and Geophysical Engineering vol. 9, No. 4, 2015) (Year: 2015).*

(Continued)

*Primary Examiner* — Brian S Cook
*Assistant Examiner* — Iftekhar A Khan
(74) *Attorney, Agent, or Firm* — Gilliam IP PLLC

(57) ABSTRACT

In some embodiments, an apparatus and a system, as well as a method and article, may operate to model electromagnetic data to provide modeled electromagnetic data by solving a first set of surface integral equations that include earth model parameters corresponding to an earth model of a geological formation. Additional activity may include publishing at least some of the modeled electromagnetic data in human-readable form, and/or controlling drilling operations in the geological formation based on the earth model when error between the modeled electromagnetic data and measured electromagnetic data is less than a selected threshold. Additional apparatus, systems, and methods are disclosed.

20 Claims, 12 Drawing Sheets

(51) Int. Cl.
*G06T 17/05* (2011.01)
*E21B 7/04* (2006.01)
*E21B 49/00* (2006.01)
*G01V 3/30* (2006.01)
*G06F 17/11* (2006.01)
*G06F 17/50* (2006.01)
*E21B 47/12* (2012.01)

(52) U.S. Cl.
CPC .............. *G01V 3/38* (2013.01); *G06F 17/11* (2013.01); *G06F 17/5009* (2013.01); *G06T 17/05* (2013.01); *E21B 47/12* (2013.01); *G06F 2217/16* (2013.01)

(56) References Cited

U.S. PATENT DOCUMENTS

| | | | | |
|---|---|---|---|---|
| 5,867,806 | A * | 2/1999 | Strickland | G01V 3/38 702/7 |
| 6,366,088 | B1 * | 4/2002 | Hagiwara | G01N 24/081 324/303 |
| 6,591,195 | B2 * | 7/2003 | Haugland | G01V 3/28 324/338 |
| 6,885,943 | B2 * | 4/2005 | Bittar | G01V 3/38 702/7 |
| 6,892,137 | B2 * | 5/2005 | Haugland | G01V 3/30 702/7 |
| 7,027,967 | B1 * | 4/2006 | Barber | G01V 11/00 703/10 |
| 7,612,566 | B2 * | 11/2009 | Merchant | G01V 3/28 324/339 |
| 7,756,641 | B2 * | 7/2010 | Donadille | G01V 3/20 702/6 |
| 7,991,553 | B2 * | 8/2011 | Alumbaugh | G01V 3/30 324/323 |
| 8,005,618 | B2 * | 8/2011 | Gzara | G01V 3/20 702/11 |
| 8,116,979 | B2 * | 2/2012 | Frenkel | G01V 3/32 702/11 |
| 8,638,103 | B2 | 1/2014 | Rosthal et al. | |
| 8,775,084 | B2 * | 7/2014 | Rabinovich | G01V 3/38 702/7 |
| 9,364,905 | B2 * | 6/2016 | Hou | G01V 3/28 |
| 9,611,731 | B2 * | 4/2017 | Hou | E21B 47/026 |
| 9,638,830 | B2 * | 5/2017 | Meyer | E21B 7/04 |
| 10,330,818 | B2 * | 6/2019 | Hou | G01V 3/38 |
| 2003/0163258 | A1 * | 8/2003 | Haugland | G01V 3/28 702/6 |
| 2008/0079723 | A1 * | 4/2008 | Hanson | G06K 9/0063 345/427 |
| 2008/0097732 | A1 | 4/2008 | Donadille et al. | |
| 2008/0275648 | A1 * | 11/2008 | Illfelder | E21B 47/022 702/7 |
| 2009/0157367 | A1 * | 6/2009 | Meyer | E21B 7/04 703/10 |
| 2010/0259267 | A1 * | 10/2010 | Rosthal | G01V 3/30 324/339 |
| 2011/0002194 | A1 * | 1/2011 | Imhof | G01V 1/32 367/53 |
| 2011/0153296 | A1 * | 6/2011 | Sadlier | E21B 44/00 703/7 |
| 2012/0080197 | A1 * | 4/2012 | Dickens | G01V 3/083 166/369 |
| 2012/0090834 | A1 * | 4/2012 | Imhof | G01V 1/307 166/250.01 |
| 2013/0018585 | A1 | 1/2013 | Zhdanov et al. | |
| 2013/0073206 | A1 * | 3/2013 | Hou | G01V 3/28 702/7 |
| 2013/0197891 | A1 * | 8/2013 | Jessop | G06T 17/05 703/9 |
| 2014/0129194 | A1 * | 5/2014 | Zhdanov | G01V 99/005 703/2 |
| 2015/0066460 | A1 * | 3/2015 | Klinger | G06F 17/5018 703/2 |
| 2016/0109604 | A1 * | 4/2016 | Zeroug | E21B 47/0005 367/13 |
| 2016/0258273 | A1 * | 9/2016 | Hou | E21B 47/026 |

OTHER PUBLICATIONS

Michelini et al. (Seismological Studies at Parkfield. I. Simultaneous Inversion for Velocity Structure and Hypocenters Using Cubic B-Splines Parameterization, Bulletin of the Seismological Society of America, Voh 81, No. 2, pp. 524-552, Apr. 1991) (Year: 1991).*
Chunduru et al. ("2-D resistivity inversion using spline parameterization and simulated annealing" Geophysics, vol. 61, No. 1 (Jan.-Feb. 1996); p. 151-161) (Year: 1996).*
Sharma at al. ("Inversion of Electrical Resistivity Data: A Review", International Scholarly and Scientific Research & Innovation 9(4) 2015, pp. 400-406) (Year: 2015).*
Schwarzbach et al. ("Two-dimensional inversion of direct current resistivity data using a parallel, multi-objective genetic algorithm", Geophys. J. Int. (2005) 162, 685-695) (Year: 2005).*
"International Application Serial No. PCT/US2015/010281, International Search Report dated Sep. 14, 2015", 3 pgs.
"International Application Serial No. PCT/US2015/010281, Written Opinion dated Sep. 14, 2015", 8 pgs.
AU Application Serial No. 2015375557, Australian Examination Report 1, dated Dec. 4, 2017, 3 Pages.
CA Application Serial No. 2,969,670, First Office Action, dated Apr. 5, 2018, 6 pages.
Canada Application Serial No. 2,969,670; Second Office Action, dated Mar. 29, 2019, 7 pages.
Indonesia Application Serial No. PI D201704025, First Office Action, dated May 15, 2019, 3 pages.
Eskola, "Geophysical Interpretation using Integral Equations", Springer-Science Business Media, B.V., 1992, 114 pages (pp. 1-38, pp. 39-76 and pp. 77-114).
Indian Application Serial No. 201717016359; First Exam Report; dated Sep. 18, 2019, 7 pages.
Chinese Application Serial No. 201580069930.5; First Office Action; dated Jan. 16, 2020, 7 pages.
Cheryauka, et al., "Fast Modeling of a Tensor Induction Tool Response in a Horizontal Well in Inhomogeneous Anisotropic Formations'", SPWLA 42nd Annual Logging Symposium; Jun. 17-21, 2001, 13 pages.

* cited by examiner

US 10,648,316 B2

FORMATION CHARACTERISTICS DETERMINATION APPARATUS, METHODS, AND SYSTEMS

BACKGROUND

Sedimentary formations generally exhibit slowly varying lateral changes in their lithological interfaces and physical properties. In some state-of-the-art logging-while-drilling (LWD) inversion methods, such as those used to determine formation resistivity based on resistivity data, the measured data are inverted on a point-by-point or sliding window basis using one-dimensional (1D) resistivity models. Predicted data and sensitivities are evaluated using semi-analytical solutions for a given set of model parameters defining the 1D resistivity model (e.g., layer thickness, resistivity, anisotropy ratio, relative dip, relative azimuth). The model parameters are then optimized such that they minimize the error between measured and predicted data subject to any enforced regularization. These inverse problems are usually over-determined. The 1D resistivity models are then stitched together to form a two-dimensional (2D) resistivity image, sometimes known as "curtain plots" by those of ordinary skill in the art.

In some cases, LWD inversions based on 2D pixel-based resistivity models or three-dimensional (3D) voxel-based resistivity models have also been disclosed. Here, the inversions are based on 2D or 3D resistivity models discretized as area elements (pixels) or volume elements (voxels), and the predicted data and sensitivities are evaluated using finite-difference, finite-element, or volume integral equation methods. The model parameters in each pixel or voxel are then optimized such that they minimize the error between measured and predicted data subject to any enforced regularization. These inverse problems are usually under-determined. In the literature, these methods have only been applied to synthetic data associated with idealistic resistivity LWD systems in isotropic formations. The performance of these methods for anisotropic formations hasn't been disclosed. These inversions are highly dependent on the choice of regularization, such as the choice of a priori model and the choice of stabilizing functional. Resistivity models often contain resistivity gradients from which formation interfaces are difficult to discern with any degree of confidence.

In each case, the resulting resistivity models often contain geologically unrealistic artefacts arising from model simplicity or an inappropriate choice of regularization.

DETAILED DESCRIPTION

Introduction to Various Embodiments

To address some of the challenges noted above, among others, many embodiments operate to improving the quantitative interpretation of resistivity LWD data by providing more efficient methods of modeling and inverting resistivity LWD data, particularly for depth-to-bed boundary (DTBB) inversions used in geosteering applications.

For the purposes of this document, resistivity LWD modeling and inversion is based on 3D earth models parameterized as multiple, arbitrary open or closed surfaces between formation layers of different anisotropic conductivity. These surfaces are discretized as a mesh of surface elements. Surface integral equations (SIEs) are formulated and solved for the EM responses, and adjoint SIEs are formulated and solved for the EM sensitivities to perturbations in resistivity and surface geometry. The SIEs may be formulated in terms of EM fields and their gradients, or in terms of equivalent electric and magnetic sources. It should be noted that while many of the examples described herein are directed to resistivity data for ease of understanding, the various embodiments are not to be so limited. The term "electromagnetic" can be substituted for "resistivity" in most cases, as those of ordinary skill in the art will realize after reading this document.

SIEs obviate the need for voxel-based discretization of the 3D earth model per state-of-the-art finite-difference, finite-element, or volume integral equation methods. Importantly, the sensitivities for the arbitrarily complex formation boundaries can be computed very efficiently and accurately using adjoint equations, without finite-differencing between models, per the state-of-the-art.

3D earth models can be deemed to have an infinite strike angle if there is no lateral variation in the strike angle direction of the 3D earth model within the resistivity LWD tool's sensitivity. In such cases, the surface integral equations can be reduced to a 2.5D formulation (i.e., a 2D earth model of infinite strike, and 3D EM source), whereby the surface integral equations are reduced to contour integral equations.

Detailed Description of Various Embodiments

Figure 1:
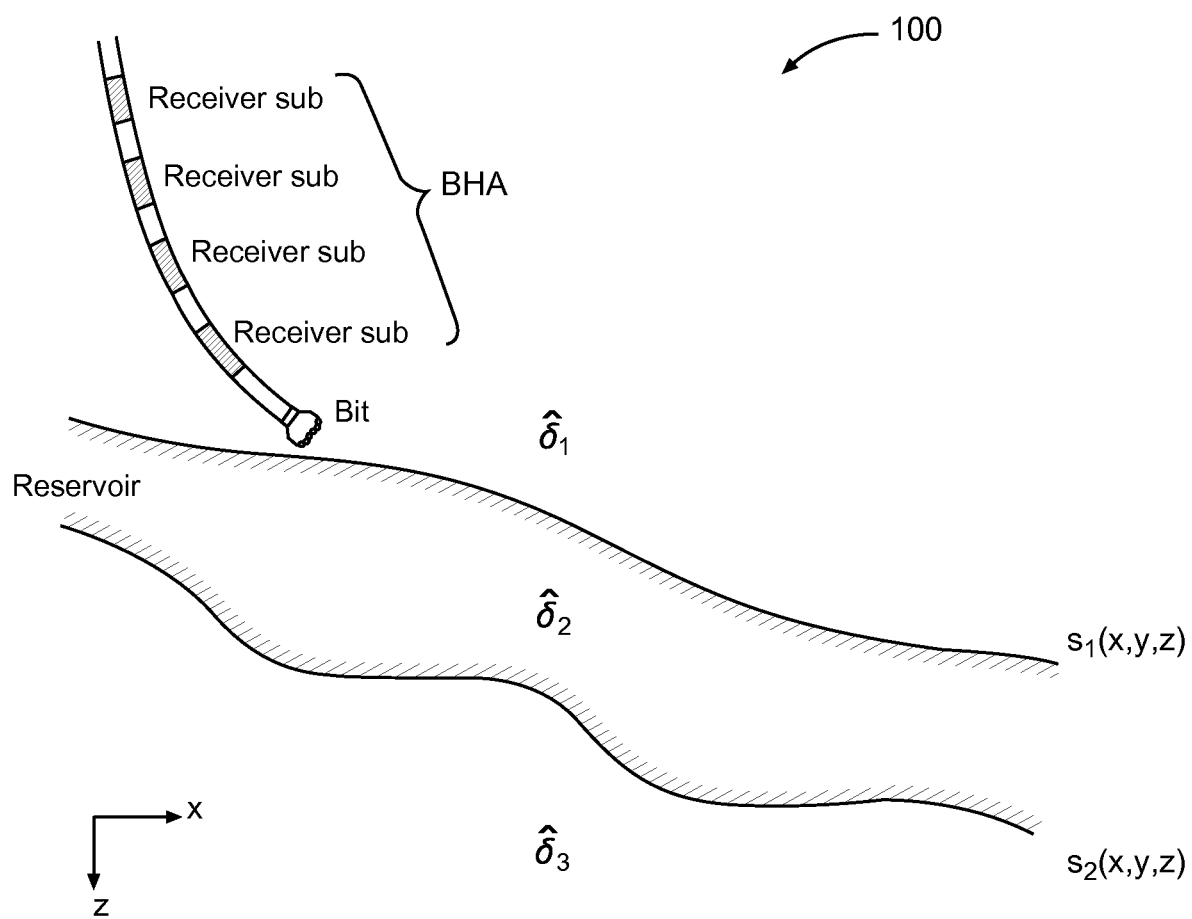
FIG. 1 illustrates a conceptual version of a 3D earth model described in terms of arbitrary surfaces, according to various embodiments of the invention.

FIG. 1 illustrates a conceptual version of a 3D earth model 100 described in terms of arbitrary surfaces $S_i$, according to various embodiments of the invention. Here the arbitrary surfaces $S_i$ bound formation layers of different conductivity $\hat{\sigma}_i$, which is the reciprocal of resistivity. The surfaces can have any geometry, and the conductivities of each layer may be anisotropic.

Conceptually, the 3D earth model 100 is not discretized in terms of voxels or 3D volume elements. Rather, the 3D earth model 100 is parameterized into a number of arbitrarily shaped surfaces that define the interfaces between different formations. SIEs are formulated and solved for the resistivity LWD responses and their sensitivities to the conductivities $\hat{\sigma}_i$ of each layer, as well as the surface geometries.

Figure 2:
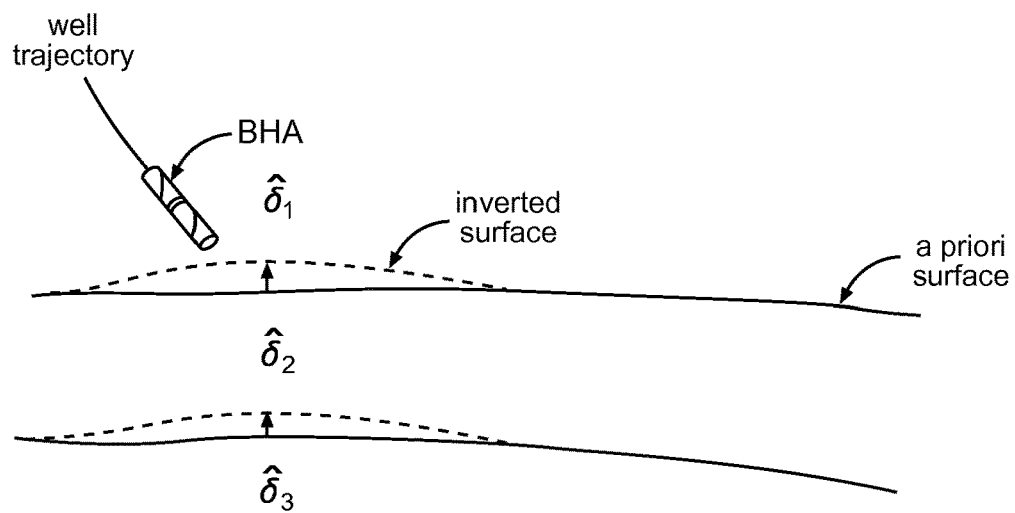
FIGS. 2-4 illustrate the use of real-time inversion with respect to a variety of layer conductivities and surfaces, according to various embodiments of the invention.
Figure 3:
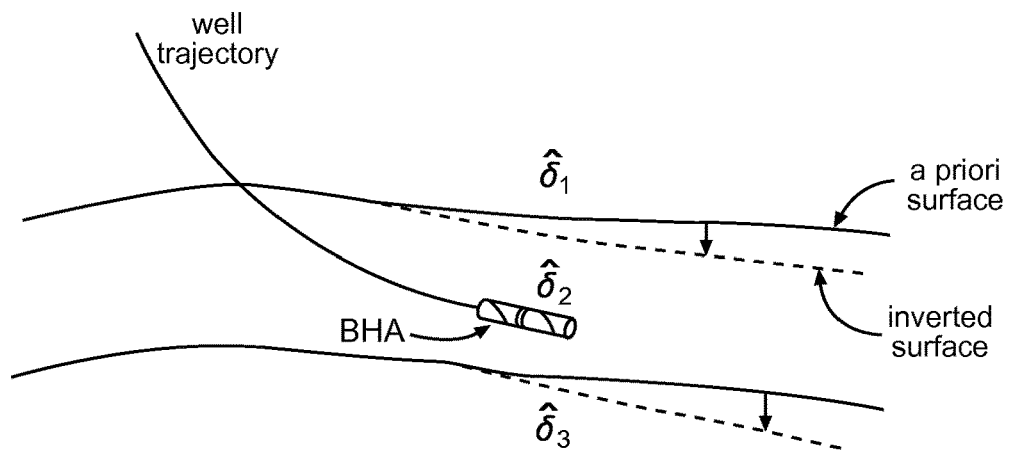
Figure 4:
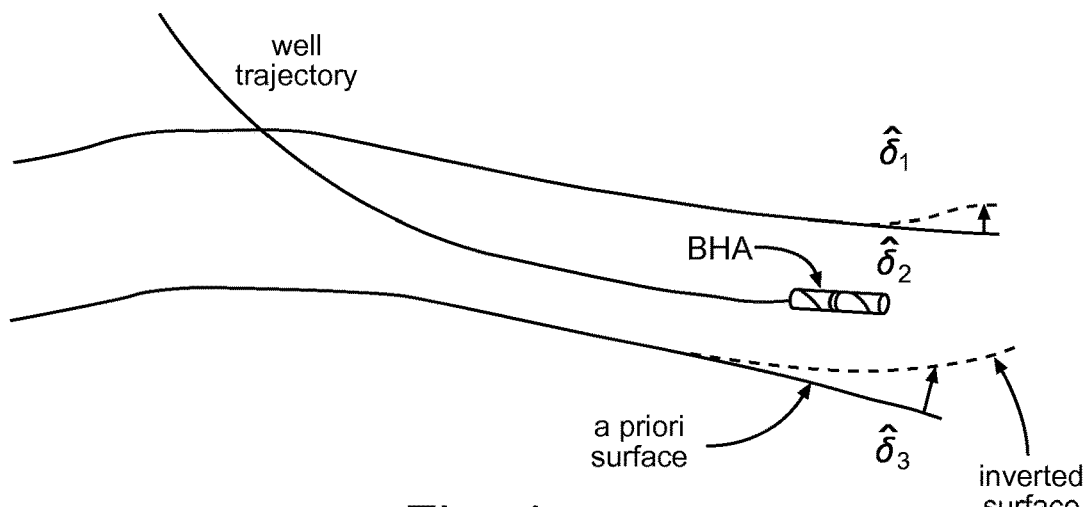

FIGS. 2-4 illustrate the use of real-time resistivity LWD inversion with respect to a variety of layer conductivities $\hat{\sigma}_i$ and surfaces, according to various embodiments of the invention. In FIG. 2, the methods of control disclosed herein are used to determine the immediately pending penetration of the surface between conductivity layers $\hat{\sigma}_1$ and $\hat{\sigma}_2$ by the bottom hole assembly (BHA), and the surface between conductivity layers $\hat{\sigma}_2$ and $\hat{\sigma}_3$, using a 3D SIE-based inversion to recover the conductivities of each layer, and the surface geometries. That is, instead of relying on a priori surface models (e.g., from 3D reflection seismic imaging), the inverted surface geometries (often at sub-seismic resolution) can be determined in real-time, and used to efficiently guide the BHA from the layer of conductivity $\hat{\sigma}_1$ into the layer of conductivity $\hat{\sigma}_2$.

In FIGS. 3 and 4, the methods disclosed herein are used to determine the surface geometries in real-time, to guide the BHA through the layer of conductivity $\hat{\sigma}_2$ (and between the layers of conductivities $\hat{\sigma}_1$ and $\hat{\sigma}_3$) by using a 3D SIE-based inversion to recover the conductivities of each layer, and the surface geometries. Again, instead of relying on the a priori surface models (e.g., from 3D reflection seismic imaging), the determination of the surface geometries (often at sub-seismic resolution), whether moving toward or away from the BHA, can be used to guide the path of the BHA.

Figure 5:
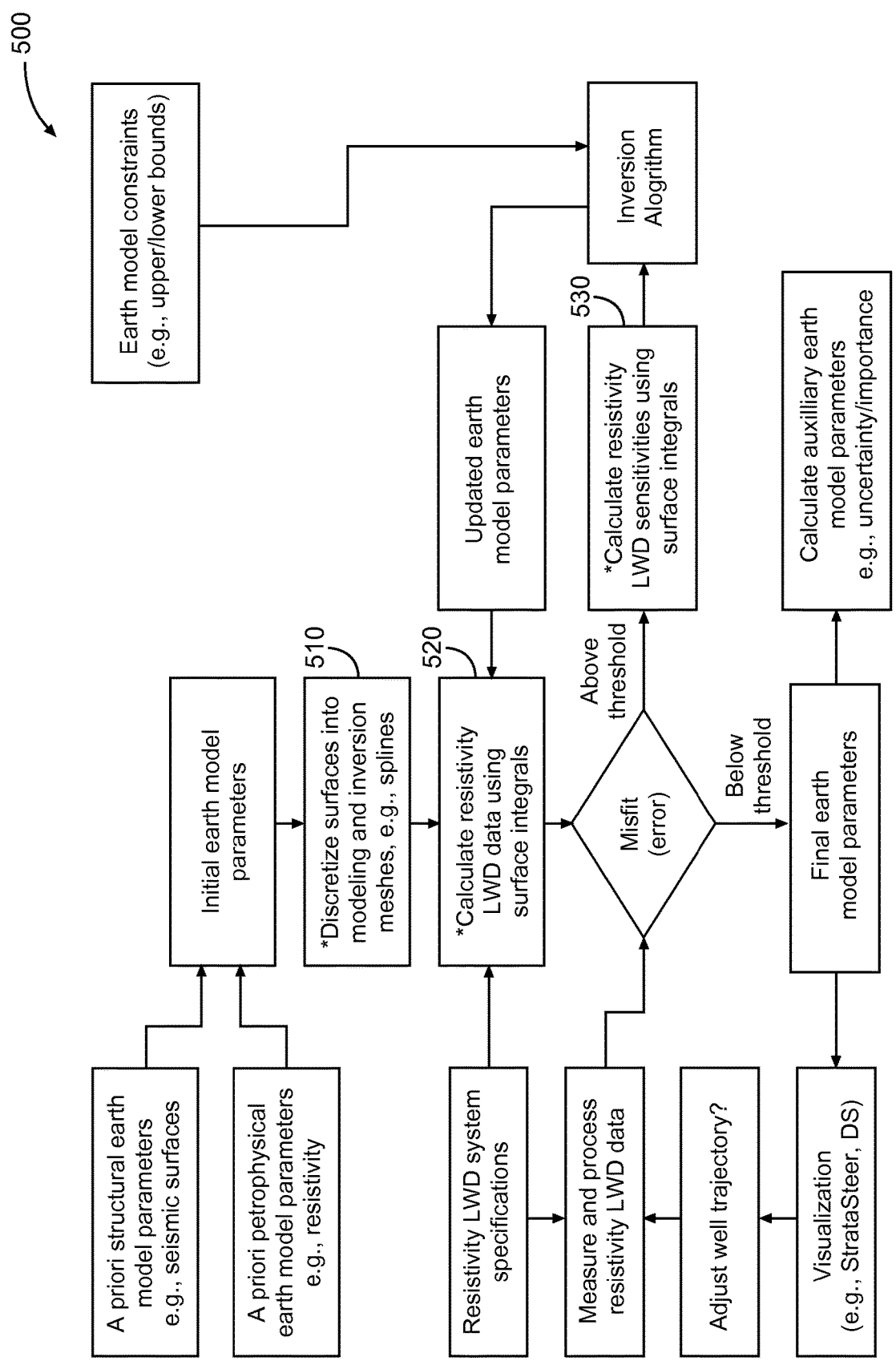
FIG. 5 is a workflow diagram that illustrates the use of real-time inversion, solving surface integral equations, according to various embodiments of the invention.

FIG. 5 is a workflow 500 diagram that illustrates the use of real-time resistivity LWD inversion solving SIEs, according to various embodiments of the invention. The workflow 500 can be realized using an appropriate choice of model parameterization, and a 3D SIE-based EM modeling method. As noted previously, for formation models with infinite strike, the method can be reduced to a 2.5D SIE-based EM modeling method, whereby the surface integral equations are reduced to contour integral equations.

Through functional representation of the 3D earth model, the number of model parameters in the inversion can be greatly minimized and solved as an over-determined inverse problem. This type of resistivity LWD solution has not been previously disclosed. Given the length and relative complexity of the details in describing the mechanisms used herein, the disclosure will be divided into components, including: earth model parameterization, surface integral equation modeling, sensitivities, inversion, and an example, with other considerations.

Earth Model Parameterization

In the discussion that follows, all EM modeling will be based on a 3D earth model. However, the dimensionality of the earth model may be either 2D or 3D. While any of the elements in the workflow 500 can form a part of the methods described herein, those marked with an asterisk (blocks 510, 520, 530) are of particular interest, constituting entirely new approach to inversion of 3D earth models for real-time resistivity LWD.

As noted at block 510, the 3D earth model is discretized with at least one continuous, non-intersecting surface that defines an interface between formations (layers) of different conductivity (e.g., see FIG. 1). The surfaces can be either bounded (e.g., a closed object, representing a pocket of a reservoir) or unbounded (e.g., having an infinite lateral extent, representing a lithological interface). The surfaces can be of arbitrary geometry.

To discretize each surface $S_i$, we can describe each surface $S_i$ by one or more continuous functions. The functions can be chosen to be continuous, so as to exploit the spatial coherencies of both the formations and resistivity LWD data.

In some embodiments, the earth model parameters can be described using splines to provide continuity, smoothness, and local support of the surfaces. The choice of splines may include, but is not limited to linear, bilinear, cubic, or B-splines. A spline representation has the advantage of reducing or minimizing the number of spline nodes used to describe the surface. Spline node spacing is dependent on the minimum of the expected length scale of variations within the formation, and the resistivity LWD system's sensitivity or footprint (e.g., if the system sensitivity is on the order of 5 m, then the spline node spacing might be set at 2.5 m or 5 m). It is noted that while splines are described herein for purposes of simplicity, any continuous spatial interpolation function (e.g., Lagrange polynomials, etc.) can be used, and various embodiments are therefore not to be so limited.

Figure 6:
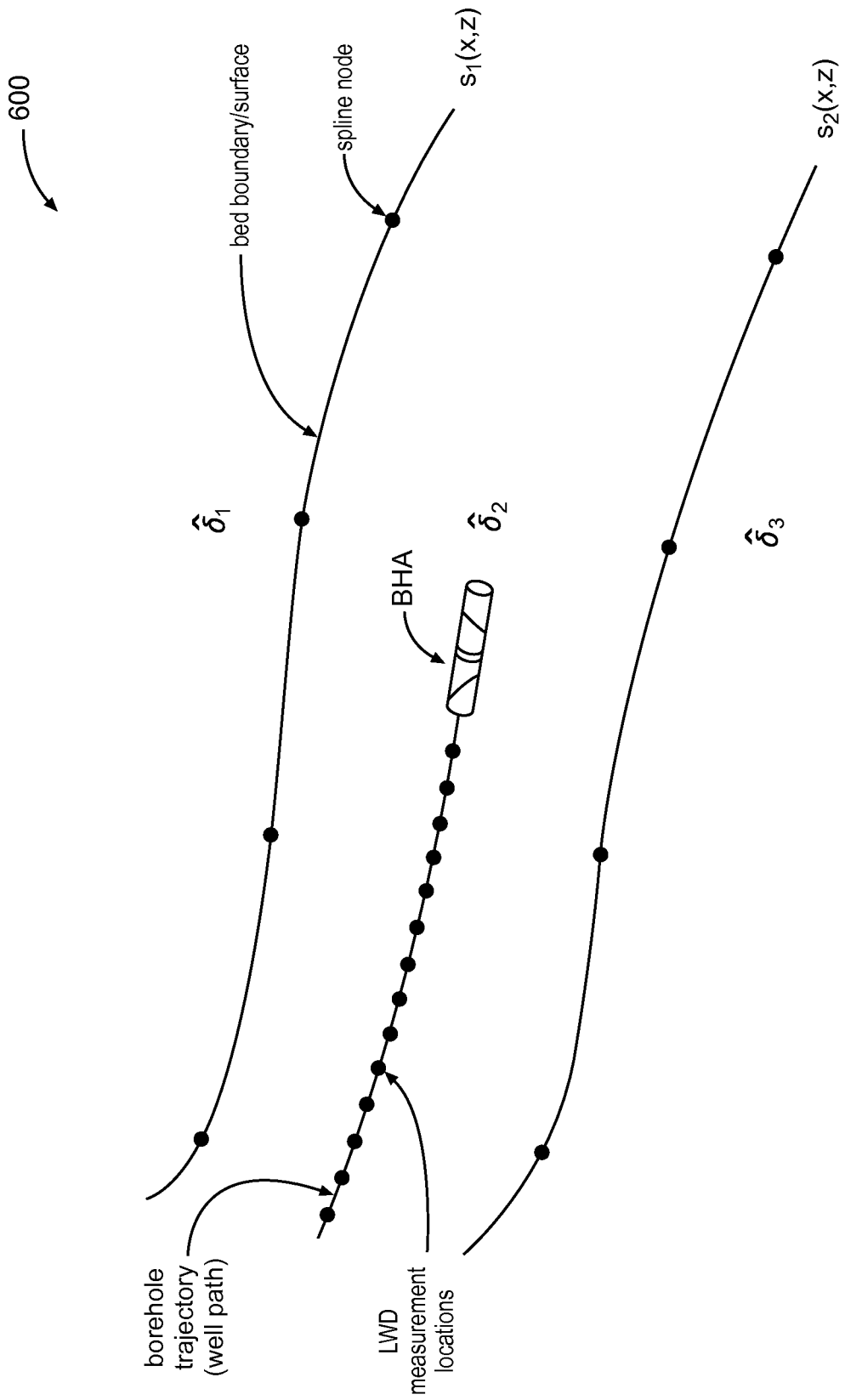
FIG. 6 illustrates a conceptual version of a 2D earth model, according to various embodiments of the invention.

FIG. 6 illustrates a conceptual version of a 2D earth model 600, according to various embodiments of the invention. The conductivity $\hat{\sigma}_i$ of each layer may be anisotropic. The surfaces $S_i$ are functionally represented by splines. The depth of a surface $S_i$ at any horizontal position (x) can be evaluated from the spline coefficients of that surface. The functional smoothness inherent in the spline enforces continuous (smooth) bed boundaries.

If the formation has a strike such that the dip perpendicular to the well trajectory is approximately zero within the resistivity LWD tool's volume of sensitivity, the 3D earth model can assumed to have infinite strike, and the 3D earth model may be reduced to a 2D earth model of infinite strike. In this case, parameterization of the boundaries can be reduced to 2D contours for each boundary (e.g., as shown in FIG. 6).

Figure 7:
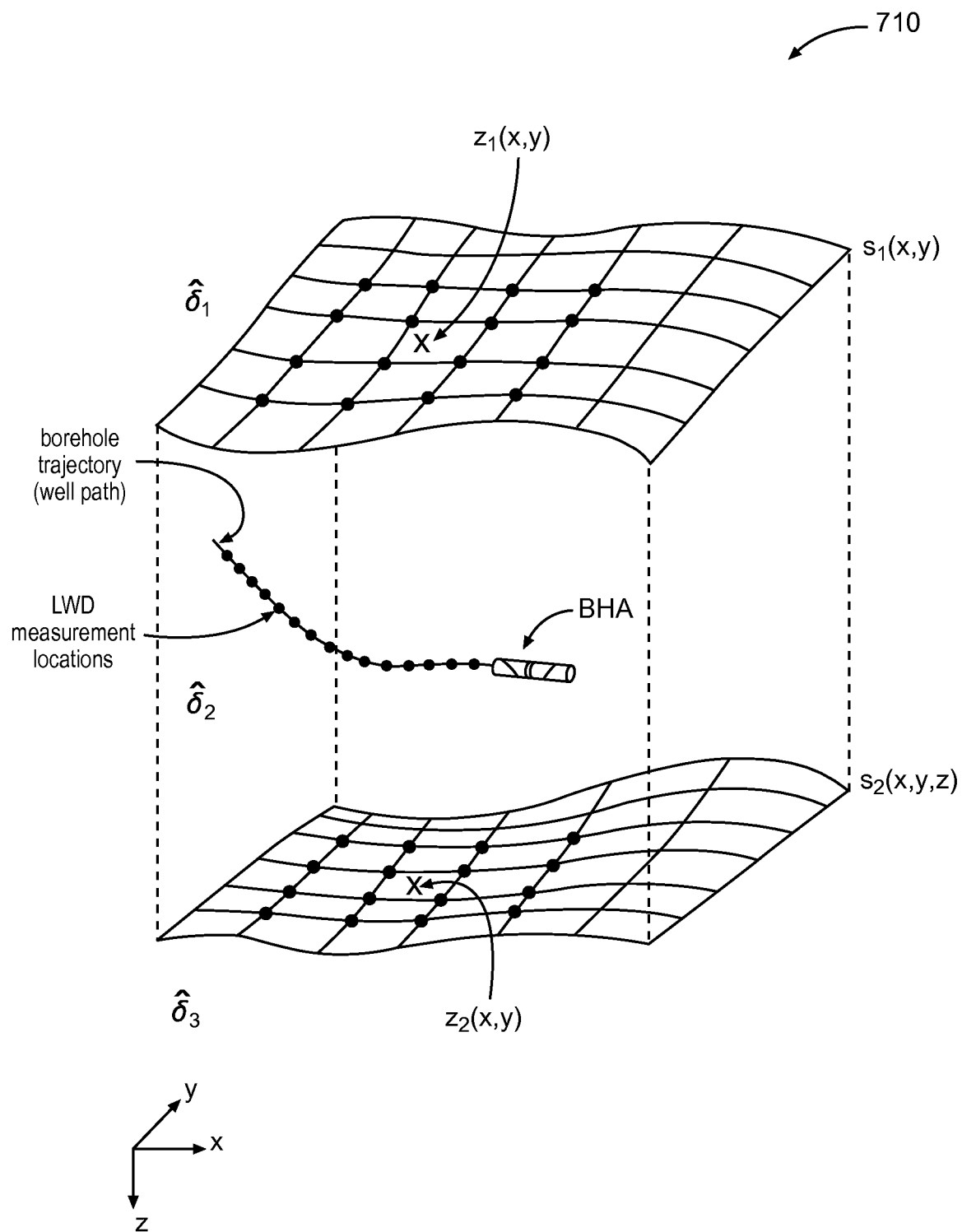
FIG. 7 illustrates a conceptual version of a 3D earth model, according to various embodiments of the invention.

If the formation has a strike such that the dip perpendicular to the well trajectory is not zero, parameterization of the boundaries can be made with 3D surfaces for each boundary (e.g., as shown in FIG. 7).

For example, consider the 2D earth model 600 shown in FIG. 6. The surfaces $S_i$ in an N-layered earth model can be completely defined by N-1 B-splines. The depth of a surface $S_i$ at any point (x), corresponding to the value of the B-spline surface at that point (x), is evaluated through the weighted sum of the four adjacent node coefficients:

$$Z_{ik}(x) = \sum_{p=i-1}^{i+2} c_{pk} w_{pk}(x), \quad (1)$$

where $c_{pk}$ and $w_{pk}(x)$ are the unknown spline coefficients and known spline weights, respectively, for the node at the $p^{th}$ node on the $k^{th}$ spline.

The sensitivities (Fréchet derivatives or Jacobians) of the spline with respect to the spline coefficients are:

$$\frac{\partial z_{ik}(x,z)}{\partial c_{pk}} = \begin{cases} w_{pk}(x,z), & i-1 \leq p \leq i+2, \\ 0, & \text{otherwise.} \end{cases} \quad (2)$$

It follows that the sensitivities (Fréchet derivatives or Jacobians) of the resistivity LWD data $d_j(x, z)$ to the spline coefficients are given by the product rule:

$$\frac{\partial d_j(x,z)}{\partial c_{pk}} = \frac{\partial d_a(x,z)}{\partial z_{ik}(x,z)} \times \frac{\partial z_{ik}(x,z)}{\partial c_{pk}}. \tag{3}$$

Note that in this case, each datum is influenced by only four adjacent nodes of each spline, so the majority of entries in the sensitivity matrix for the 2D model are zero. In a subsequent section, we disclose how the sensitivities $$\frac{\partial d_a(x,z)}{\partial z_{ik}(x,z)}$$

can be calculated accurately and efficiently.

FIG. 7 illustrates a conceptual version of a 3D earth model 700, according to various embodiments of the invention. The conductivity $\hat{\sigma}_i$ of each layer may be anisotropic. The surfaces $S_i$ are functionally represented by spline meshes. The depth of a surface $S_i$ at any horizontal position (x,y) can be evaluated from the spline coefficients of that surface. The functional smoothness inherent in the spline enforces continuous (smooth) bed boundaries.

As another example, consider the 3D earth model 700 in FIG. 7. This particular model can be used to capture azimuthal features of the formation (e.g., dip or azimuth) that may not be possible to retrieve from 2D earth models. The surfaces $S_i$ in an N-layered earth model can be completely defined by N-1 B-spline meshes. The depth of a surface at any point (x,y), corresponding to the value of the B-spline surface at that point (x,y), is evaluated through the weighted sum of the sixteen adjacent node coefficients:

$$z_{ijk}(x,y) = \Sigma_{p=i-1}^{i+2} \Sigma_{q=j-1}^{j+2} c_{pqk} w_{pqk}(x,y) \tag{4}$$

where $C_{pqk}$ and $W_{pqk}(x, y)$ are the unknown spline coefficients and known spline weights, respectively, for the node at the $p^{th}$ and $q^{th}$ nodes on the $k^{th}$ spline mesh.

The sensitivities (Fréchet derivatives or Jacobians) of the spline with respect to the spline coefficients are:

$$\frac{\partial z_{ijk}(x,z)}{\partial c_{pqk}} = \begin{cases} w_{pqk}(x,z), & i-1 \le p \le i+2, j-1 \le q \le j+2 \\ 0, & \text{otherwise} \end{cases} \tag{5}$$

It follows that the sensitivities (Fréchet derivatives or Jacobians) of the data $d_j(x, z)$ to the spline coefficients are given by the product rule:

$$\frac{\partial d_j(x,z)}{\partial c_{pqk}} = \frac{\partial d_a(x,z)}{\partial z_{ijk}(x,z)} \times \frac{\partial z_{ijk}(x,z)}{\partial c_{pqk}}. \tag{6}$$

Note that in this case, each datum is influenced by only sixteen adjacent nodes of each spline mesh, so the majority of entries in the sensitivity matrix for the 3D model are zero. In a subsequent section, we disclose how the sensitivities $$\frac{\partial d_a(x,z)}{\partial z_{ik}(x,z)}$$

can be calculated accurately and efficiently.

In both equations (1) and (4), the spline weights are a function only of position on the surface $S_i$ at which the surface $S_i$ is being evaluated, and therefore remains constant during the inversion. Hence, the inversion may be directed to recover the spline coefficients $c_{pk}$ for 2D earth models, or $c_{pqk}$ for 3D earth models.

In most embodiments, there is no requirement that the spline node spacing should be equidistant. In real-time applications, the spline node spacing may be dynamically modified (e.g., increased or decreased), so that, for example, a relatively flat geology permits rapid drilling with spline nodes that are spaced farther apart than otherwise.

Moreover, as can be seen in FIGS. 3 and 4, the spline coefficients in front of the LWD tool position can be extrapolated from spline coefficients nearby and behind the leading LWD tool position; thus enabling a "look ahead" model to be predicted for the purpose of steering the BHA within the formation.

Another potential advantage arises from the choice of the spline node spacing: this choice implicitly introduces a sliding window on the inversion via equations (1) and (4); without accounting for the sliding window in terms of algorithm/software bookkeeping. This reduces algorithm complexity.

Finally, it is noted that lateral smoothness of the 3D earth model is implicitly enforced by the use of splines, without the need to explicitly introduce lateral constraints or penalty terms into the regularization. This further reduces algorithm complexity. However, regularization intended to explicitly smooth the spline coefficients can be enforced.

When fully realized, the above advantages of the various apparatus, systems, and methods described herein can significantly simplify algorithm design and software engineering relative to inversions with sliding windows and/or lateral constraints on the surfaces. However, the problem of computing resistivity LWD responses and sensitivities for the associated surfaces remains. A mechanism to address this challenge will be discussed in subsequent sections.

Modeling

In the following paragraphs, it should be noted that a surface $S_i$ can be discretized into a variety of element shapes (e.g., triangles or quadrilaterals), with associated EM fields being described by a variety of basis functions (e.g., pulse, linear, polynomial, exponential). The choice of each will depend upon the desired numerical implementation of the method.

Figure 8:
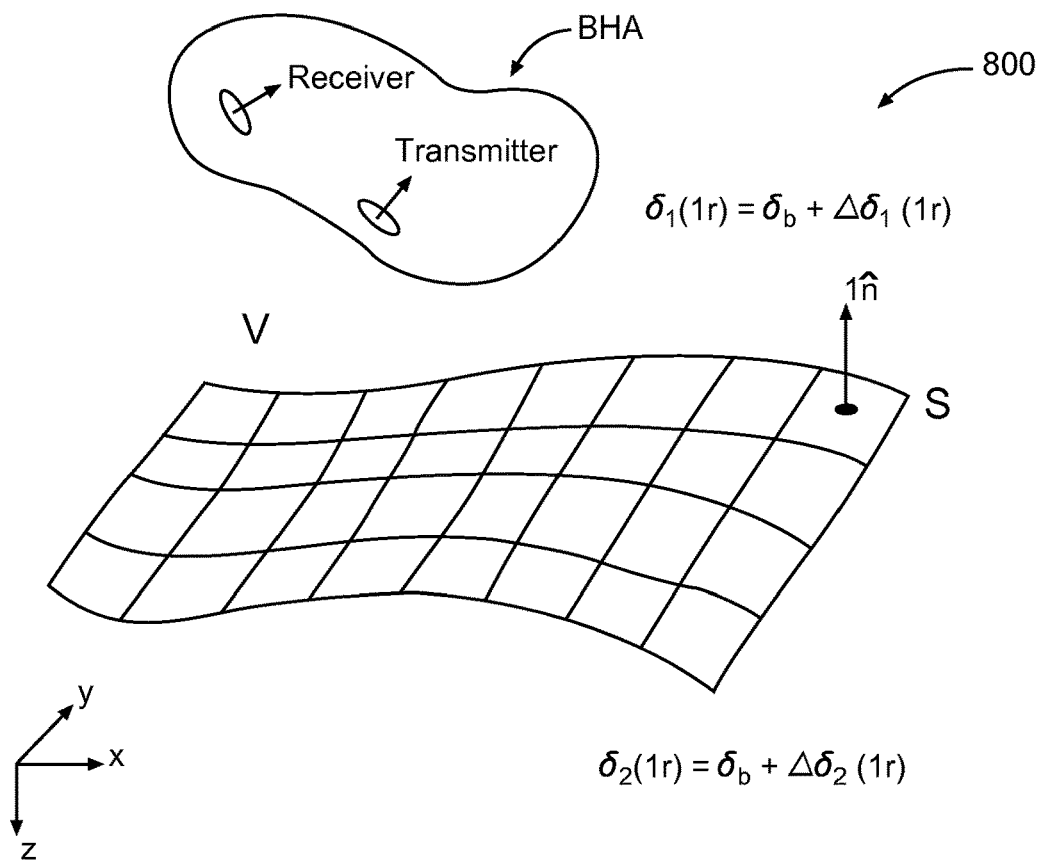
FIG. 8 illustrates a two-layered 3D earth model, with an arbitrarily-shaped surface discretized into quadrilateral elements, according to various embodiments of the invention.

FIG. 8 illustrates a two-layered 3D earth model 800, with arbitrarily-shaped surface S discretized into quadrilateral elements, according to various embodiments of the invention. The resistivity LWD responses and sensitivities at the receiver are computed using SIEs along surface S that solve for the equivalent electric and magnetic sources along surface S that preserve the continuity of the electric and magnetic fields tangential to surface S in each quadrilateral element.

Consider the parameterized two-layer earth model 800 in FIG. 8 that consists of a single, arbitrary surface S separating two formations of different isotropic conductivity $\hat{\sigma}_1$ and $\hat{\sigma}_2$. Here the layers have parameters assigned (e.g., horizontal resistivity) to describe them.

Here it is assumed that all media are nonmagnetic, such that $\mu = \mu_0$. The model 800 can then be separated into background (b) and anomalous (a) parts, such that:

$$\sigma(r) = \sigma_b(r) + \Delta\sigma(r), \tag{7}$$

where r is a radius vector, $\sigma_b$ is the background conductivity model, and $\Delta\sigma$ is the anomalous conductivity model that is superimposed upon the background conductivity model $\sigma_b$, which can be developed from actual or offset well resistivity measurements. These conductivities may be complex and frequency-dependent; i.e., inclusive of dielectric and induced polarization terms.

The electric and magnetic fields can then be separated into their background and anomalous parts:

$$E(r)=E^b(r)+E^a(r), \quad (8)$$

$$H(r)=H^b(r)+H^a(r), \quad (9)$$

such that the electric and magnetic fields satisfy radiation boundary conditions (i.e., at an infinite distance, the electric and magnetic field tends toward zero). The complexity of the background conductivity model can be chosen as desired. For the following discussion, it is assumed that the background conductivity model is that of an isotropic whole-space such that there is no dependency on r. This implies that the background electric and magnetic fields can be evaluated from analytic functions. This also implies the background fields can be analytically differentiated; the significance of which will be described below.

Along the surface S, continuity of the tangential electric and magnetic fields should be preserved, as follows:

$$\hat{n} \times (E_1 - E_2) = 0, \quad (10)$$

$$\hat{n} \times (H_1 - H_2) = 0, \quad (11)$$

where $\hat{n}$ is the outward normal unit vector. Defining $E_2^b = H_2^b = 0$, the equations (10) and (11) can be re-arranged as transmission boundary conditions:

$$\hat{n} \times E_1^a - \hat{n} \times E_2^a = -\hat{n} \times E^b, \quad (12)$$

$$\hat{n} \times H_1^a - \hat{n} \times H_2^a = -\hat{n} \times H^b, \quad (13)$$

The total tangential electric and magnetic fields along S can be replaced with fictitious (yet equivalent) electric $J_e$ and magnetic $J_m$ current densities that preserve continuity of the tangential electric and magnetic fields. Both source types (i.e., electric and magnetic sources) are converted to correctly account for inductive and galvanic components of the EM fields within a conductive formation.

These current densities are defined to satisfy Maxwell's equations for each layer 1:

$$\nabla \times E_i^a = -i\omega\mu H_i^a - J_m, \quad (14)$$

$$\nabla \times H_i^a = \Delta\sigma_i E_i^a + J_e. \quad (15)$$

For electric current sources $J_e$ only, the magnetic vector potential A is introduced as:

$$A_i(r) = \int_S g_i(r, r') J_e(r') ds' \quad (16)$$

where:

$$g_i(r, r') = \frac{e^{ik_i|r-r'|}}{4\pi|r-r'|}, \quad (17)$$

is the scalar Green's function for the inhomogeneous scalar Helmholtz equation:

$$\nabla^2 g_i(r,r') + k_i^2 g_i(r,r') = -\delta(r), \quad (18)$$

and where:

$$k_i^2 = i\omega\mu\sigma_i \quad (19)$$

is the complex wavenumber, based on the angular frequency, magnetic permeability, and conductivity.

Since:

$$H_i^a(r) = \nabla_r \times A_i(r), \quad (20)$$

$$E_i^a(r) = \Delta\sigma_i^{-1} \nabla_r \times H_i^a(r), \quad (21)$$

for electric current sources only, it follows that the anomalous electric and magnetic fields can be defined as:

$$E_i^a(r) = \Delta\sigma_i^{-1} \nabla_r \times \nabla_r \times \int_S g_i(r;r') J_e(r') ds', \quad (22)$$

$$H_i^a(r) = \nabla_r \times \int_S g_i(r;r') J_e(r') ds'. \quad (23)$$

Similarly, for magnetic current sources $J_m$, the magnetic vector potential F is introduced as:

$$F_i(r) = \int_S g_i(r;r') J_e(r') ds', \quad (24)$$

where $g_i(r,r')$ is the scalar Green's function for the inhomogeneous scalar Helmholtz equation, per equation (20).

Since:

$$E_i^a(r) = \nabla_r \times F_i(r), \quad (25)$$

$$H_i^a(r) = \frac{-1}{i\omega\mu} \nabla_r \times \nabla_r \times E_i^a(r), \quad (26)$$

for magnetic current sources only, it follows that the anomalous electric and magnetic fields are defined as:

$$E_i^a(r) = \nabla_r \times \int_S g_i(r, r') J_m(r') ds', \quad (27)$$

$$H_i^a(r) = \frac{-1}{i\omega\mu} \nabla_r \times \nabla_r \times \int_S g_i(r, r') J_m(r') ds'. \quad (28)$$

Hence, the anomalous electric and magnetic fields due to both electric and magnetic current sources are the sum of equations (22) and (27), and equations (23) and (28):

$$E^a(r) = \quad (29)$$
$$\Delta\sigma_i^{-1} \nabla_r \times \nabla_r \times \int_S g_i(r, r') J_e(r') ds' + \nabla_r \times \int_S g_i(r, r') J_m(r') ds',$$

$$H^a(r) = \quad (30)$$
$$\nabla_r \times \int_S g_i(r, r') J_e(r') ds' - \frac{1}{i\omega\mu} \nabla_r \times \nabla_r \times \int_S g_i(r, r') J_m(r') ds'.$$

where r∈S.

Since the electric and magnetic current sources are fictional, they can be defined as follows:

$$J_e(r') = \Delta\sigma_i a(r'), \quad (31)$$

$$J_m(r') = i\omega\mu b(r'), \quad (32)$$

such that equations (29) and (30) can be rewritten as:

$$E^a(r) = \nabla_r \times \nabla_r \times \int_S g_i(r;r') a(r') ds' + i\omega\mu \nabla_r \times \int_S g_i(r;r') b(r') ds', \quad (33)$$

$$H^a(r) = \Delta\sigma_i \nabla_r \times \int_S g_i(r;r') a(r') ds \nabla_r \times \nabla_r \times \int_S g_i(r;r') b(r') ds', \quad (34)$$

to avoid numerical errors when $\Delta\sigma_i(r) \to 0$.

To calculate the anomalous fields at the resistivity LWD tool receivers, a solution should be determined for the surface currents a and b. Transmission boundary conditions are enforced by substituting equations (33) and (34) into equations (12) and (13) for r,r'∈S. Following theorems that are known to those of ordinary skill in the art:

$$\hat{n}(r) \times \int_S \nabla_r \times g(r,r') a(r') ds' = \tfrac{1}{2} a(r) + \int_S \hat{n}(r) \times \nabla_r \times g(r,r') a(r') ds',$$

for any continuous Green's function g and density a, it follows that:

$$\frac{i\omega\mu}{2}b(r) + \int_S \hat{n}(r) \times \nabla_r \times \nabla_r \times [g_1(r,r') - g_2(r,r')]a(r')ds' + \quad (35)$$

$$i\omega\mu \int_S \hat{n}(r) \times \nabla_r \times [g_1(r,r') - g_2(r,r')]b(r')ds' = -\hat{n}(r) \times E^b(r'),$$

$$\frac{\Delta\sigma_1(r) - \Delta\sigma_2(r)}{2}a(r) + \quad (36)$$

$$\int_S \hat{n}(r) \times \nabla_r \times [\Delta\sigma_1(r)g_1(r,r') - \Delta\sigma_2(r)g_2(r,r')]a(r')ds' -$$

$$\int_S \hat{n}(r) \times \nabla_r \times [g_1(r,r') - g_2(r,r')]b(r')ds' = -\hat{n}(r) \times H^b(r').$$

Equations (35) and (36) are two coupled Fredholm integral equations of the second kind for the fictional surface currents a and b. These can be discretized, and assembled into the linear system:

$$\begin{bmatrix} K_{11} & K_{12} \\ K_{21} & K_{22} \end{bmatrix} \begin{bmatrix} b \\ a \end{bmatrix} = \begin{bmatrix} S_1 \\ S_2 \end{bmatrix}. \quad (37)$$

where the subscripts to K denote partitions in the global system matrix for the linear operators in (35) and (36). Since each element interacts with each other element, the global system matrix is full and non-symmetric. However, the matrix is sufficiently small that a direct solver (e.g., Gauss elimination) can be used. Ideally, the matrix would be inverted using singular value decomposition (SVD). While storage requirements for direct solvers become inefficient for large matrices, they are capable of solving many source vectors simultaneously; an advantage when simulating the operation of resistivity LWD systems. In some embodiments, iterative solvers can be applied that solve for at least one source vector.

As written, the surface S has infinite extent. Since the electric and magnetic fields satisfy radiation boundary conditions, this implies that the surface S can be truncated at some distance proximal to the transmitters and receivers such that errors due to the truncation are negligible. For commonly available resistivity tools, this distance will be relatively short, given the tool's limited volume of sensitivity. Truncation is analogous to the use of a sliding window applied in state-of-the-art resistivity LWD inversion.

Upon solving for the sources a and b along the surface S per equation (42), the electric and magnetic fields can be computed at any position in either layer from equations (33) and/or (34).

Prior SIE formulations, and their derivatives, assume that the transmitter and receiver exist in an infinitely resistive layer (e.g., air) such that the magnetic field in the layer containing the transmitter and receiver can be reduced to a scalar potential—effectively neglecting galvanic (current gathering) components of the EM fields. As mentioned earlier, this neglect is not practical for resistivity LWD measurements, where the transmitters and receivers are located within conductive formations.

The formulation derived above can be extended to multiple open or closed surfaces, provided that the transmission boundary conditions are simultaneously satisfied at each surface. The above formulation can also be extended to anisotropic formations.

In some embodiments, the background conductivity can be described by a tensor:

$$\hat{\sigma}_b = \begin{bmatrix} \sigma_{xx} & \sigma_{xy} & \sigma_{xz} \\ \sigma_{yx} & \sigma_{yy} & \sigma_{yz} \\ \sigma_{zx} & \sigma_{zy} & \sigma_{zz} \end{bmatrix}, \quad (38)$$

such that the scalar Green's functions for the inhomogeneous scalar Helmholtz equation of an isotropic whole space are replaced with a Green's tensor for inhomogeneous vector Helmholtz equation of an anisotropic whole space:

$$\hat{G}(r,r') = \begin{bmatrix} g_{xx}(r,r') & g_{xy}(r,r') & g_{xz}(r,r') \\ g_{yx}(r,r') & g_{yy}(r,r') & g_{yz}(r,r') \\ g_{zx}(r,r') & g_{zy}(r,r') & g_{zz}(r,r') \end{bmatrix}, \quad (39)$$

where the elements $g_{ij}(r,r')$ have an analytic form. The anisotropy may be uniaxial or biaxial, with the full tensor forms of equations (38) and (39) obtained from Euler rotation of the uniaxial or biaxial tensors.

In some embodiments, the scalar anomalous conductivity for each layer can replaced by an anomalous conductivity tensor for each layer:

$$\Delta\hat{\sigma}_b = \begin{bmatrix} \Delta\sigma_{xx} & \Delta\sigma_{xy} & \Delta\sigma_{xz} \\ \Delta\sigma_{yx} & \Delta\sigma_{yy} & \Delta\sigma_{yz} \\ \Delta\sigma_{zx} & \Delta\sigma_{zy} & \Delta\sigma_{zz} \end{bmatrix}, \quad (40)$$

The anisotropy may be uniaxial or biaxial, and the full tensor forms of equations (38) and/or (40) can be obtained from Euler rotation of the uniaxial or biaxial tensors. This enables the modeling of cross-bedding in each layer.

The above formulations can also be extended to background conductivity models that are vertically or radially layered, or are otherwise inhomogeneous. These extensions manifest through appropriate modifications of the Green's tensors (39) and conductivity tensors (38) and (40).

Figure 9:
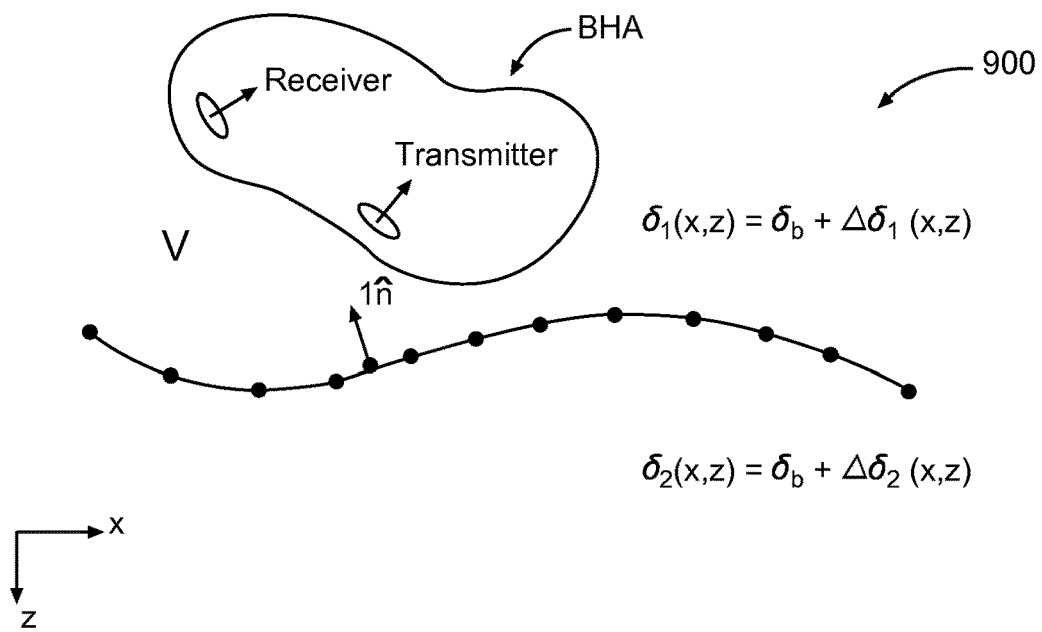
FIG. 9 illustrates a two-layered 2D earth model, with an arbitrarily-shaped surface discretized into contours, according to various embodiments of the invention.

FIG. 9 illustrates a two-layered 2D earth model, with an arbitrarily-shaped surface discretized into contours, according to various embodiments of the invention. This model includes an infinite strike angle in the (y) direction). The responses and sensitivities at the receiver are computed using surface (or contour) integral equations along surface S that solve for equivalent electric and magnetic sources along surface S that preserve the continuity of the electric and magnetic fields tangential to surface S in each contour element.

If the 3D earth model has infinite strike (in this case, in the y-direction), equations (33) and (34) can be converted to the (x, $k_y$, z) domain using a Fourier transformation. This reduces the 3D problem to the solution of $N_{k_y}$ 2 D problems. The surface integrals for each surface then reduce to contour integrals for each surface in the (x, $k_y$, z) domain (as shown in FIG. 9). In practice, the system is solved for a limited number of spatial transform values (e.g., twenty-one) logarithmically spaced from about $10^{-5}$ m$^{-1}$ to about 0.1 m$^{-1}$, and the responses and sensitivities in the Fourier domain are evaluated. These responses and sensitivities are then splined and converted to the Cartesian domain using an inverse Fourier transform.

In some embodiments, the SIEs are solved as Fredholm integral equations of the second kind. In some embodiments, the surface integral equations may be solved with a linear or nonlinear approximation of the Fredholm integral equations of the second kind. These approximations may degrade the accuracy of the solutions while improving computational efficiency.

Sensitivities

For linearized inversion, the resistivity LWD responses defined above are used (see block 520 in FIG. 5), as well as the sensitivities (or Fréchet derivatives or Jacobians) defined as the perturbation obtained in the response due to a perturbation of a model parameter (see block 530 of FIG. 5):

$$S_{ji} = \frac{\partial d_j}{\partial m_i}. \tag{41}$$

where data point j is sensitive to model parameter i.

For the model shown in FIG. 5, there are two types of model parameters: conductivities of for each layer, and surface geometries for each layer. Returning to equations (3) or (6), the sensitivities for the spline coefficients describing each surface are to be calculated.

The sensitivities (41) can be numerically approximated with a finite-difference:

$$S_{ji} \approx \frac{\Delta d_j}{\Delta m_i}. \tag{42}$$

Calculating the sensitivities in this manner makes use of an additional forward model for each model parameter. In existing 1D resistivity LWD inversions, this is common practice for model parameters deemed to be nonlinear, such as surface depth. However, it is inaccurate and inefficient.

Note that in each of the additional forward models for equation (42), the system matrix (37) is modified and thus requires anew construction and decomposition. For 3D problems like those described herein, such computational inefficiencies are to be avoided. Instead, adjoint equations that are analogous to the original Maxwell's equations are preferably formulated and solved.

Those sensitivity computations based on single parameter differentiation can preserve the global stiffness matrix (37) with an additional right-hand side (RHS) source term for each model parameter for each transmitter RHS source term. The application of this solution to surface geometry has never been disclosed, or described in the literature.

Given the global stiffness matrix has already been decomposed with a direct solution for the forward modeling, minimal computational effort is needed to evaluate the sensitivities. This can be efficient when the number of model parameters is less than the number of receivers per transmitter position, because it is relatively easy to fit a few model parameters to many data points.

Alternatively, sensitivity computations based on domain differentiation can preserve the global stiffness matrix (37) with an additional RHS source term for each transmitter RHS source term. Again, this approach for surface geometry has never been described or disclosed in the literature. Engaging this approach eliminates the need to compute additional RHS source terms for each model parameter, for each transmitter RHS source term. Given the global stiffness matrix has already been decomposed with a direct solution for the forward modeling, minimal computational effort required to evaluate the sensitivities, irrespective of the number of model parameters or receivers.

In most embodiments, adjoint equations can be used in a novel manner to evaluate the sensitivities for both conductivity and surface depth. Herein, adjoint operators are implemented to evaluate the tool sensitivities for surface depth.

In some embodiments, finite-differences may be used to evaluate the sensitivities. In some embodiments, modeling approximations (e.g., linear or nonlinear integral equation approximations) may be used to evaluate the sensitivities.

Figure 10:
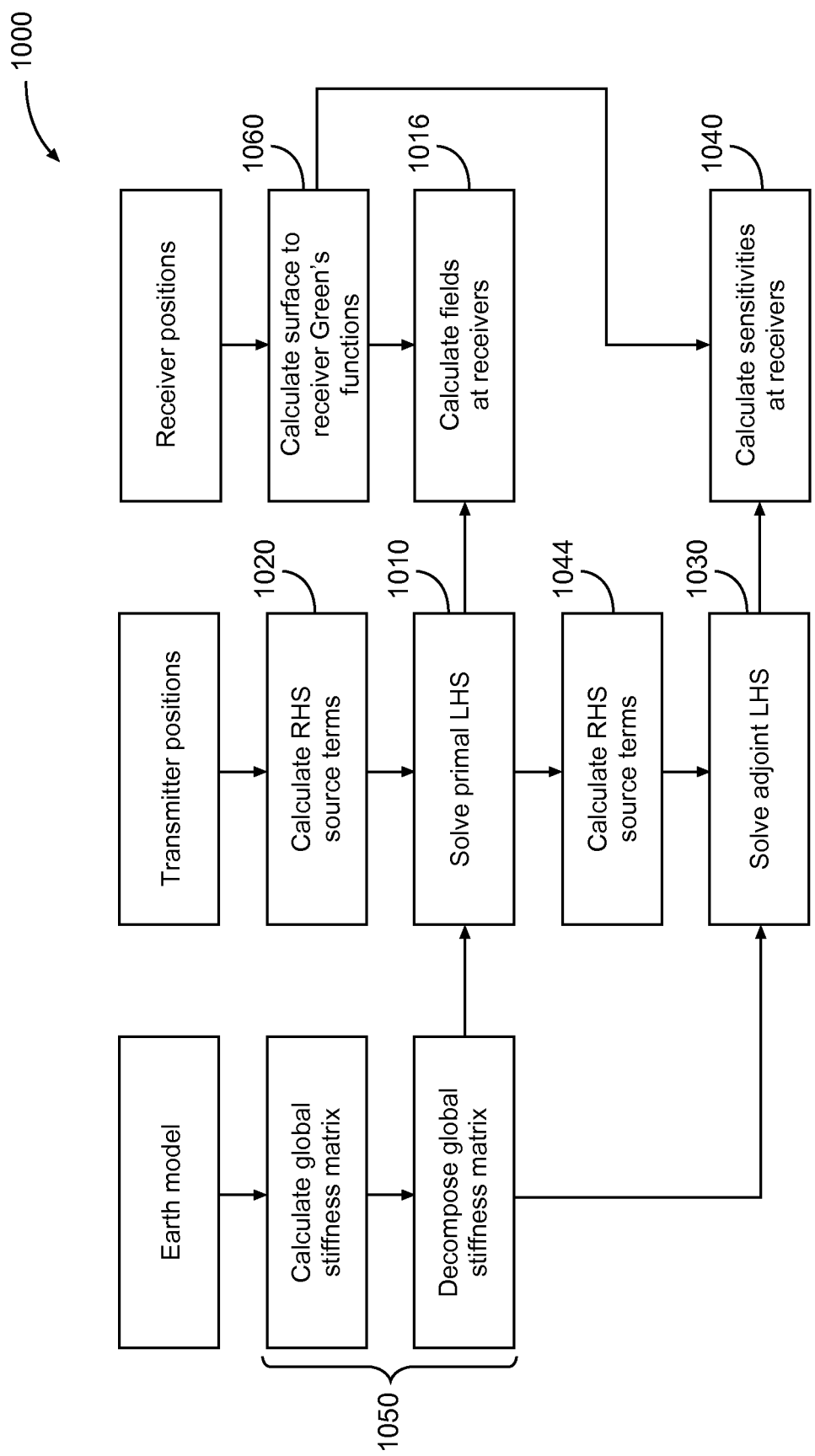
FIG. 10 is a workflow diagram that illustrates the evaluation of resistivity responses and sensitivities using adjoint operators, according to various embodiments of the invention.

FIG. 10 is a workflow 1000 diagram that illustrates the evaluation of resistivity LWD responses and sensitivities using adjoint operators, according to various embodiments of the invention. In this case, the term "primal" refers to the solution of the EM fields, and "adjoint" refers to the solution of the EM field sensitivities. The primal left-hand side (LHS, at block 1010) is the surface current terms used to calculate the EM fields at the receivers (at block 1016) from the primal right hand side (RHS, at block 1020) of primary source terms. The adjoint LHS (at block 1030) is the adjoint surface current terms used to calculate the EM field sensitivities at the receivers (at block 1040). The adjoint RHS (at block 1044) is evaluated from the primal LHS solution (at block 1010). Note that the global stiffness matrix 1050 and surface-to-receiver Green's functions 1060 are common between primal and adjoint problems. For each primal solution, only one adjoint solution needs to be evaluated.

Sensitivities with Respect to Surface Geometry

To determine sensitivities with respect to surface geometry, the discussion will begin with calculating the sensitivities of a surface depth $$\frac{\partial d_a(x, z)}{\partial z_{ik}(x, z)},$$

shown in equations (3) and (6). This begins by differentiating equations (33) and (34) with respect to surface depth:

$$\frac{\partial E^a(r)}{\partial z(r')} = \nabla_r \times \nabla_r \times \int_S \left[ \frac{\partial g_i(r, r')}{\partial z(r')} a(r') + g_i(r, r') \frac{\partial a(r')}{\partial z(r')} \right] ds' + \tag{43}$$
$$i\omega\mu\nabla_r \times \int_S \left[ \frac{\partial g_i(r, r')}{\partial z(r')} b(r') + g_i(r, r') \frac{\partial b(r')}{\partial z(r')} \right] ds',$$

$$\frac{\partial H^a(r)}{\partial z(r')} = \Delta\sigma_i \nabla_r \times \int_S \left[ \frac{\partial g_i(r, r')}{\partial z(r')} a(r') + g_i(r, r') \frac{\partial a(r')}{\partial z(r')} \right] ds' - \tag{44}$$
$$\nabla_r \times \nabla_r \times \int_S \left[ \frac{\partial g_i(r, r')}{\partial z(r')} b(r') + g_i(r, r') \frac{\partial b(r')}{\partial z(r')} \right] ds',$$

Note $$\frac{\partial g_i(r, r')}{\partial z(r')} \neq 0$$

since $g_i(r,r')$ is analytic, continuous, and differentiable in z.

Defining $$c(r') = \frac{\partial a(r')}{\partial z(r')} \text{ and } d(r') = \frac{\partial b(r')}{\partial z(r')}$$

as a matter of convenience, and separating the integrals in equations (43) and (44), it can be understood that:

$$\frac{\partial E^a(r)}{\partial z(r')} = \nabla_r \times \nabla_r \times \int_S g_i(r, r') c(r') ds' + i\omega\mu \nabla_r \times \int_S g_i(r, r') d(r') ds' + \qquad (45)$$

$$\nabla_r \times \nabla_r \times \int_S \frac{\partial g_i(r, r')}{\partial z(r')} a(r') ds' + i\omega\mu \nabla_r \times \int_S \frac{\partial g_i(r, r')}{\partial z(r')} b(r') ds',$$

$$\frac{\partial H^a(r)}{\partial z(r')} = \qquad (46)$$

$$\Delta\sigma_i \nabla_r \times \int_S g_i(r, r') c(r') ds' - \nabla_r \times \nabla_r \times \int_S g_i(r, r') d(r') ds' +$$

$$\Delta\sigma_i \nabla_r \times \int_S \frac{\partial g_i(r, r')}{\partial z(r')} a(r') ds' - \nabla_r \times \nabla_r \times \int_S \frac{\partial g_i(r, r')}{\partial z(r')} b(r') ds'.$$

The sensitivities satisfy the boundary conditions:

$$\hat{n} \times \frac{\partial E_1^a(r)}{\partial z(r')} - \hat{n} \times \frac{\partial E_2^a(r)}{\partial z(r')} = -\hat{n} \times \frac{\partial E^p(r)}{\partial z(r')}, \qquad (47)$$

$$\hat{n} \times \frac{\partial H_1^a(r)}{\partial z(r')} - \hat{n} \times \frac{\partial H_2^a(r)}{\partial z(r')} = -\hat{n} \times \frac{\partial H^p(r)}{\partial z(r')}, \qquad (48)$$

Substituting equation (45) into (47):

$$\frac{i\omega\mu}{2} d(r) + \int_S \hat{n}(r) \times \nabla_r \times \nabla_r \times [g_1(r, r') - g_2(r, r')] c(r') ds' + \qquad (49)$$

$$i\omega\mu \int_S \hat{n}(r) \times \nabla_r \times [g_1(r, r') - g_2(r, r')] d(r') ds' + \frac{i\omega\mu}{2} a(r) +$$

$$\int_S \hat{n}(r) \times \nabla_r \times \nabla_r \times \left[ \frac{\partial g_1(r, r')}{\partial z(r')} - \frac{\partial g_2(r, r')}{\partial z(r')} \right] a(r') ds' + i\omega\mu$$

$$\int_S \hat{n}(r) \times \nabla_r \times \left[ \frac{\partial g_1(r, r')}{\partial z(r')} - \frac{\partial g_2(r, r')}{\partial z(r')} \right] b(r') ds' = -\hat{n} \times \frac{\partial E^p(r)}{\partial z(r')},$$

and shifting known (source) terms to the RHS, provides:

$$\frac{i\omega\mu}{2} d(r) + \int_S \hat{n}(r) \times \nabla_r \times \nabla_r \times \left[ \frac{\partial g_1(r, r')}{\partial z(r')} - \frac{\partial g_2(r, r')}{\partial z(r')} \right] c(r') ds' + \qquad (50)$$

$$i\omega\mu \int_S \hat{n}(r) \times \nabla_r \times [g_1(r, r') - g_2(r, r')] d(r') ds' = -\hat{n} \times \frac{\partial E^p(r)}{\partial z(r')} -$$

$$\frac{i\omega\mu}{2} a(r) - \int_S \hat{n}(r) \times \nabla_r \times \nabla_r \times \left[ \frac{\partial g_1(r, r')}{\partial z(r')} - \frac{\partial g_2(r, r')}{\partial z(r')} \right] a(r') ds' -$$

$$i\omega\mu \int_S \hat{n}(r) \times \nabla_r \times [g_1(r, r') - g_2(r, r')] b(r') ds'.$$

Substituting equation (46) into (48):

$$\frac{\Delta\sigma_1 - \Delta\sigma_2}{2} c(r) + \int_S \nabla_r \times [\Delta\sigma_1 g_1(r, r') - \Delta\sigma_2 g_2(r, r')] c(r') ds' - \qquad (51)$$

$$\int_S \hat{n} \times \nabla_r \times \nabla_r \times [g_1(r, r') - g_2(r, r')] d(r') ds' + \frac{\Delta\sigma_1 - \Delta\sigma_2}{2} a(r) +$$

$$\int_S \nabla_r \times \left[ \Delta\sigma_1 \frac{\partial g_1(r, r')}{\partial z(r')}(r, r') - \Delta\sigma_2 \frac{\partial g_2(r, r')}{\partial z(r')}(r, r') \right] a(r') ds' -$$

$$\int_S \hat{n} \times \nabla_r \times \nabla_r \times \left[ \frac{\partial g_1(r, r')}{\partial z(r')} - \frac{\partial g_2(r, r')}{\partial z(r')} \right] d(r') ds' = -\hat{n} \times \frac{\partial H^p(r)}{\partial z(r')},$$

and shifting known (source) terms to the RHS, provides:

$$\frac{\Delta\sigma_1 - \Delta\sigma_2}{2} c(r) + \int_S \nabla_r \times [\Delta\sigma_1 g_1(r, r') - \Delta\sigma_2 g_2(r, r')] c(r') ds' - \qquad (52)$$

$$\int_S \hat{n} \times \nabla_r \times \nabla_r \times [g_1(r, r') - g_2(r, r')] d(r') ds' =$$

$$-\hat{n} \times \frac{\partial H^p(r)}{\partial z(r')} - \frac{\Delta\sigma_1 - \Delta\sigma_2}{2} a(r) -$$

$$\int_S \nabla_r \times \left[ \Delta\sigma_1 \frac{\partial g_1(r, r')}{\partial z(r')}(r, r') - \Delta\sigma_2 \frac{\partial g_2(r, r')}{\partial z(r')}(r, r') \right] a(r') ds' +$$

$$\int_S \hat{n} \times \nabla_r \times \nabla_r \times \left[ \frac{\partial g_1(r, r')}{\partial z(r')} - \frac{\partial g_2(r, r')}{\partial z(r')} \right] d(r') ds'.$$

Equations (50) and (52) are two coupled Fredholm integral equations of the second kind for the sensitivities of fictional surface currents a and b to depth. These can be discretized and assembled into the linear system:

$$\begin{bmatrix} K_{11} & K_{12} \\ K_{21} & K_{22} \end{bmatrix} \begin{bmatrix} d \\ c \end{bmatrix} = \begin{bmatrix} S_3 \\ S_4 \end{bmatrix}, \qquad (53)$$

where the global stiffness matrix is identical to equation (37). If the matrix is decomposed for solving equation (37), solutions to equation (53) can be obtained with minimal computational effort.

The sensitivities at each receiver for the depth of a surface $Z_i$ at position r' are then given by discrete forms of:

$$\frac{\partial E^a(r)}{\partial z_i(r')} = \qquad (54)$$

$$\nabla_r \times \nabla_r \times \int_{S_i} g_i(r, r') c(r') ds' + i\omega\mu \nabla_r \times \int_{S_i} g_i(r, r') d(r') ds' +$$

$$\nabla_r \times \nabla_r \times \int_{S_i} \frac{\partial g_i(r, r')}{\partial z(r')} a(r') ds' +$$

$$i\omega\mu \nabla_r \times \int_{S_i} \frac{\partial g_i(r, r')}{\partial z(r')} b(r') ds',$$

$$\frac{\partial H^a(r)}{\partial z_i(r')} = \qquad (55)$$

$$\Delta\sigma_i \nabla_r \times \int_{S_i} g_i(r, r') c(r') ds' - \nabla_r \times \nabla_r \times \int_{S_i} g_i(r, r') d(r') ds' +$$

$$\Delta\sigma_i \nabla_r \times \int_{S_i} \frac{\partial g_i(r, r')}{\partial z(r')} a(r') ds' -$$

$$\nabla_r \times \nabla_r \times \int_{S_i} \frac{\partial g_i(r, r')}{\partial z(r')} b(r') ds'.$$

Note that for $$\frac{\partial E^a(r)}{\partial z_i(r')} \text{ and } \frac{\partial H^a(r)}{\partial z_i(r')},$$

the integrations are over each surface element $S_i$ rather than all surface elements S.

With the solution of equations (54) and (55), we have calculated the sensitivities of the surface depths as shown in equations (3) and (6). Moreover, these sensitivities are computed at the expense of one RHS source term for equation (53), for every one RHS source term for equation (37). This solution represents a novel mechanism to deter mine sensitivities for the depths of an arbitrary surface separating two layers. The method can be extended to multiple surfaces separating multiple formation layers.
Sensitivities with Respect to Anomalous Conductivity Equations (33) and (34) can also be differentiated with respect to the anomalous conductivity of each layer. The derivation is less tedious than the above for layers, since $$\frac{\partial g_i(r, r')}{\partial \Delta \sigma(r')} = 0.$$

Since those of ordinary skill in the art, upon reading this document, can now understand how sensitivities for the depths of an arbitrary surface separating two finite conductivity layers can be determined, for purposes of economy in this disclosure, derivations for the sensitivities of the anomalous conductivity of each layer are not included here.
Inversion Methodology Previous sections have described methods of evaluating resistivity LWD responses and sensitivities, with respect to resistivity. With these values, any linearized inversion method (e.g., conjugate gradient, Gauss-Newton) and any choice of regularization can be formulated.

Figure 11:
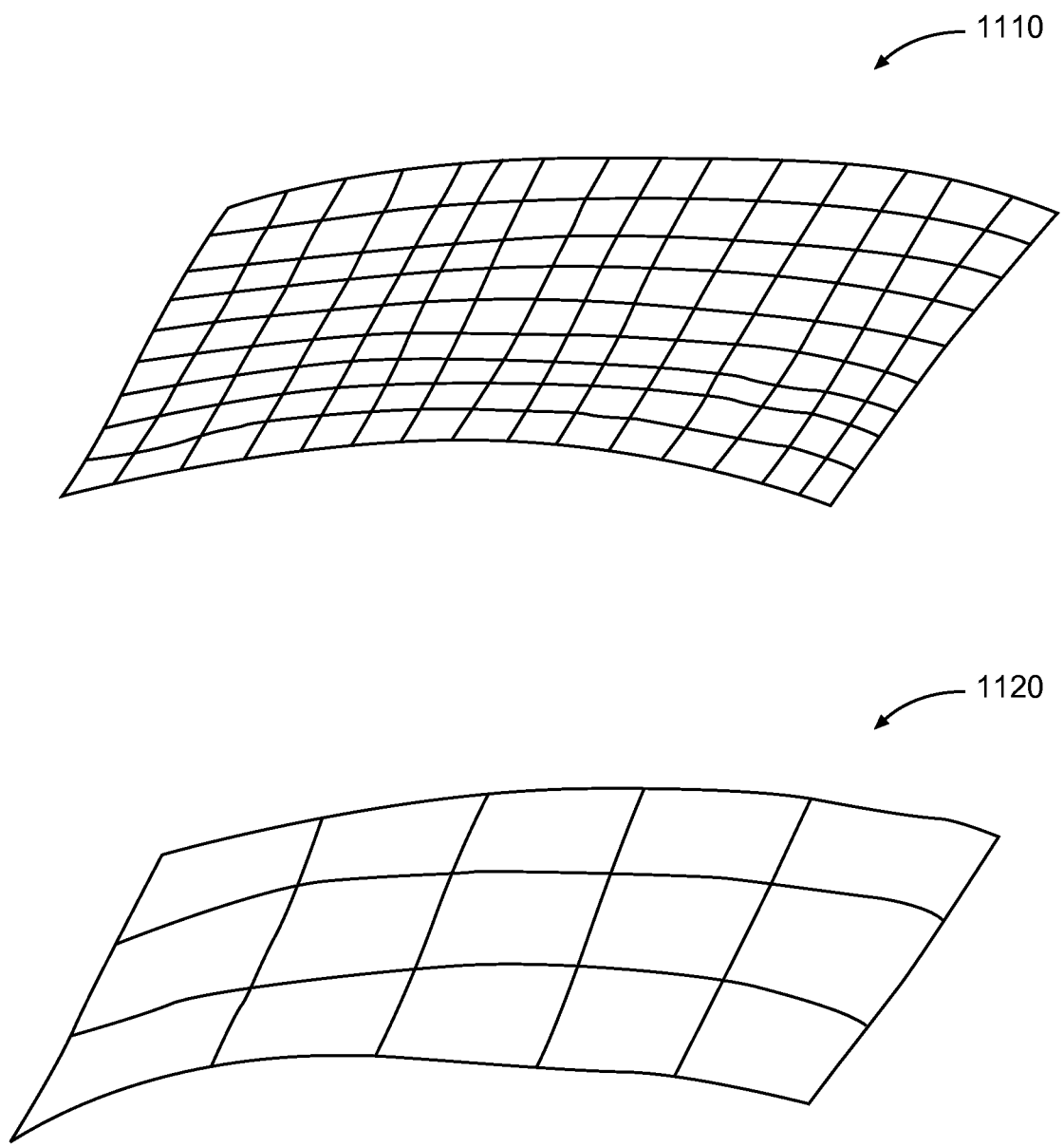
FIG. 11 illustrates different approaches to discretization, according to various embodiments of the invention.

For example, FIG. 11 illustrates different approaches to discretization, according to various embodiments of the invention. Here each surface 1110, 1120 may be discretized differently for modeling and inversion, respectively. For example, fine discretization of the surface 1110 may be useful for modeling responses and sensitivities using surface integral equations. In the case of surface 1120, coarse discretization may be useful for inversion. Upscaling and downscaling between the grids of the surfaces 1110, 1120 can be achieved through interpolation, e.g., splines. Using a variety of discretization intervals may be useful in reducing the number of model parameters required for inversion, while at the same time preserving the resolution desired to maintain modeling accuracy.

For example, when a spline representation of each surface is used, the sensitivities for every modeling node need not be computed as part of the inversion. Instead, computations are made only at the spline node control points that are defined by the discretization process. Given the continuous representation of the surface via splines, the number of inversion model parameters can be significantly reduced.

For real-time geosteering applications, an inversion algorithm that automatically determines optimal regularization parameters is often useful. This permits the operator to focus on inversion quality, rather than on the mechanics of inversion. To this end, a stabilizing functional constructed according to classic Tikhonov regularization is avoided. Instead, the Taylor series for a perturbation about a given vector of model parameters is truncated, m (e.g., layer conductivities, surface depths), such that:

$$d = A(m) + J\Delta m, \quad (56)$$

where d is the vector of observed data, and A is the nonlinear forward operator. J is the sensitivity matrix of sensitivities evaluated earlier.

Data and model weights can be applied to equation (56), effectively transforming the values into logarithmic data and model space, such that the dynamic range of the data and model weights are decreased. This can improve inversion performance.

The vector of model parameter updates $\Delta m$ can be solved via the generalized inverse (or pseudo-inverse) of the sensitivity matrix:

$$\Delta m = J^+[d - A(m)] = J^+ p, \quad (57)$$

where p is the vector of residual errors. One relatively stable and efficient manner of evaluating the generalized inverse of the sensitivity matrix is via singular value decomposition (SVD). Regardless of whether the inversion is over-determined or under-determined equation (57) can be solved using the SVD of either J or $J^T$ to eliminate eigenvector null spaces. Stability of the generalized inverse can be enforced via damping of the singular values. This method can be useful, as the amount of damping is a function of the singular values themselves. This mechanism explicitly avoids constructing a stabilizing functional and needing to select an optimal regularization parameter. Rather, stability is enforced by damping contributions from irrelevant model parameters (i.e., those with small singular values, relative to the measurement data). Damping conditions can be preset to eliminate the need for user intervention. This approach is useful, as an efficient method of solving for a small number of model parameters.

In some embodiments, a dynamic misfit functional can be applied to switch between functional parameterization of the earth model. The complexity of the functional parameterization can be increased (e.g., piece-wise constant to piece-wise linear to polynomial/spline) or decreased (e.g., polynomial/spline to piece-wise linear to piece-wise constant) depending on the dynamic misfit functional. This enables the functional complexity of the earth model to be dynamically adjusted according to a data-derived metric. For example, if the measured data undergoes minimal change, modeling can be done on a coarser scale.

In some embodiments, at least one uncertainty and/or quality control indicator (e.g., upper or lower bounds from uncertainty/confidence intervals, importance) may be represented on the same spline nodes and/or mesh.
An Example, and other Considerations As an example of the foregoing, consider the 2D earth model 600 shown in FIG. 6 as a candidate for DTBB inversion. For an azimuthal deep resistivity (ADR) tool, data might be acquired every 0.15 m. For a 15 m long section of the well trajectory, this corresponds to approximately 90 tool positions. At each tool position, there will be four data measured at 500 MHz: resistivity up, resistivity down, and binned data for the upper and lower layers (Rup, Rdn, Bup, Bdn); giving a total of 360 data points for the 15 m long section of the well trajectory.

If the inversion were done on a point-by-point basis or even with lateral constraints, there would be five model parameters per tool position: two bed boundaries, and three resistivity values; giving a total of 450 model parameters. This inversion would be over-determined, meaning there are more model parameters than data points.

For 3D inversion, a spline node spacing of 5 m would be satisfactory, as this could be inferred as the minimum expected lateral scale of resistivity variations within the formation, and is approximately the dimension of the ADR system's footprint. This means that the 15 m long 2D section of the three-layered earth model in FIG. 6 is completely defined by four spline coefficients for each of two splines (i.e., one spline for each bed boundary/interface), plus conductivities for each layer; for a total of eleven model parameters. This inversion would be under-determined, meaning there are more data points than model parameters, and presents a more desirable scenario.

This is only one example of a numerical method than can be derived to solve the 3D SIE modeling problem. Other formulations can be derived. Fundamentally, all formulations can be classified into two groups, depending on the nature of the unknowns in the surface integral equations. One group solves for the EM fields or EM field derivatives (i.e., potentials) along the surfaces. The other group solves for equivalent sources (e.g., electric and magnetic surface currents) along the same surfaces.

In many embodiments, surfaces are continuous. However, in some embodiments, these calculations can be used to represent discontinuous surfaces, including faults. The angle and throw of the fault can be arbitrary. The associated earth model may comprise multiple faults.

In some embodiments, the measured LWD data can be splined; effectively to provide a low pass filter of the measured LWD data and provide a form of data compression. This splined representation of the LWD data can be used as data that is input into subsequent inversion algorithms.

In some embodiments, the surfaces can be interpolated to or from an array of control points (i.e., spline nodes) to provide a form of data compression, e.g., to minimize data transmission and improve telemetry bandwidth.

In most embodiments, a priori information can be imposed on the 3D earth model as a choice of data weights, model weights, regularization, model constraints, and/or a priori models.

In some embodiments, a priori information about the interfaces can include surfaces determined by seismic analysis (e.g., 3D reflection seismics) and/or well ties. It is recognized that the resolution of such models is generally lower than the resolution of well logs. However, they can provide information with respect to general structural trends. In some embodiments, a priori information about the resistivity model can be derived from an existing resistivity LWD inversion workflow (e.g., 1D inversion).

In some embodiments, existing 1D inversion methods can be used to evaluate shallow formation resistivity; and this information is then used to constrain model parameters (e.g., layer resistivity) in the disclosed 3D inversion mechanism. In some embodiments, existing 1D inversion methods can also be used to derive an initial resistivity model for input to the disclosed 3D inversion mechanism. This initial resistivity model may comprise resistivities and layer boundaries estimated from at least one point along the well trajectory. The initial resistivity model may be constructed from independent earth models at each measured depth along the well trajectory, or from a curtain model along the well trajectory.

In some embodiments, the disclosed 3D inversion mechanism can be merged with existing 1D inversion in a workflow, such that an algorithm selects between 1D and 3D inversion depending on the geological complexity and observed inversion performance. For example, if 1D inversion consistently fails to converge to an acceptable solution (e.g., within three attempts), the workflow automatically upgrades processing to the 3D inversion. This approach can be useful in regions of faulted formations.

In some embodiments, a priori information about the resistivity model can be derived from interrogation and/or analysis of prior EM surveys (e.g., marine controlled-source EM surveys; borehole-to-surface EM surveys; cross-well EM surveys). It is recognized that the resolution of such models is generally lower than the resolution of well logs, however they can provide information with respect to general structural trends.

The modeling and inversion methods described in this document can be implemented as either a stand-alone software or integrated into a commercial geosteering software package (e.g., Halliburton Company's StrataSteer® 3D) or earth modeling software (e.g., Halliburton Company's DecisionSpace®) through an application programmable interface (API).

The resistivity LWD modeling and/or inversion algorithms disclosed herein may be encapsulated in software which may be programmed on serial and/or parallel (including GPU) processing architectures.

Processing of the resistivity LWD modeling, inversion, and related functions may be performed locally (e.g., downhole), on the surface at the well site, or remotely from the well site (e.g., in cloud computers), whereby computers at the well site are connected to the remote processing computers via a network. This means that the computers at the well site don't require high computational performance, and subject to network reliability, all resistivity LWD modeling and/or inversion can effectively be done in real time.

In addition to determining the joint inversion of resistivity LWD data, the methods disclosed herein can be used in conjunction with any other LWD data (e.g., acoustic, nuclear). Thus, many embodiments may be realized.

Logging System

Figure 12:
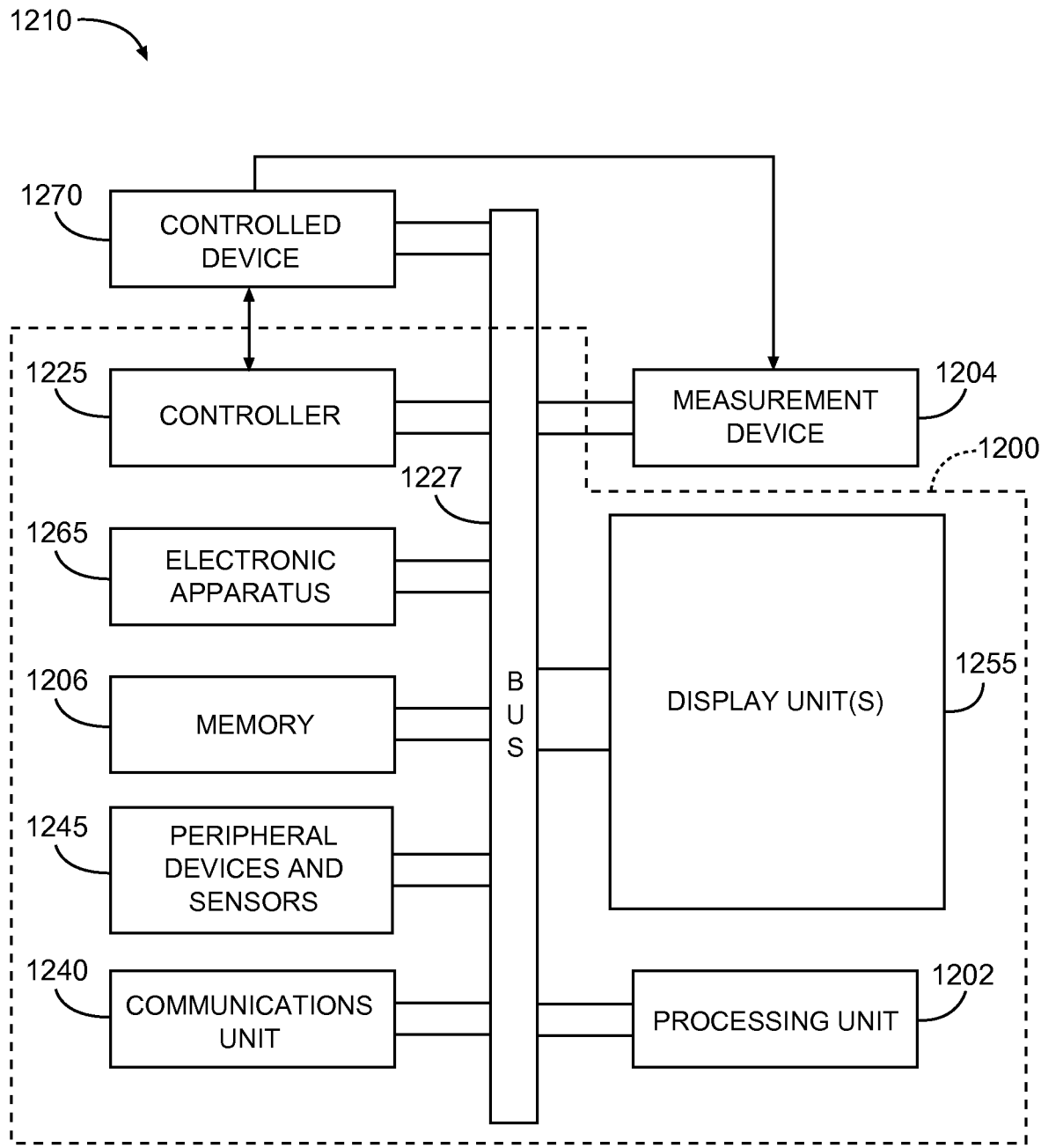
FIG. 12 is a block diagram of a data acquisition, processing, and control system according to various embodiments of the invention.

For example, FIG. 12 is a block diagram of a data acquisition, processing, and control system 1200 according to various embodiments of the invention. Here, it can be seen that the system 1200 may include a controller 1225 specifically configured to interface with a controlled device 1270, such as a geosteering unit, and/or a user display or touch screen interface, in addition to displays 1255. The system 1200 may further include electromagnetic transmitters and receivers, as shown in FIGS. 8-9, as part of the measurement device 1204. When configured in this manner, the logging system 1200 can receive measurements and other data (e.g., location and conductivity or resistivity information) to be processed according to various methods described herein.

The processing unit 1202 can be coupled to the measurement device 1204 to obtain measurements from the measurement device 1204, and its components. In some embodiments, a logging system 1200 comprises a housing (not shown in FIG. 12; see FIGS. 14-15) that can house the measurement device 1204, the controlled device 1270, and other elements. The housing might take the form of a wireline tool body, or a downhole tool as described in more detail below with reference to FIGS. 14 and 15. The processing unit 1202 may be part of a surface workstation or attached to a downhole tool housing.

The logging system 1200 can include a controller 1225, other electronic apparatus 1265, and a communications unit 1240. The controller 1225 and the processing unit 1202 can be fabricated to operate the measurement device 1204 to acquire measurement data, such as signals representing sensor measurements, perhaps resulting from EM investigation of a surrounding formation.

Electronic apparatus 1265 (e.g., electromagnetic sensors, current sensors) can be used in conjunction with the controller 1225 to perform tasks associated with taking measurements downhole. The communications unit 1240 can include downhole communications in a drilling operation. Such downhole communications can include a telemetry system.

The logging system 1200 can also include a bus 1227 to provide common electrical signal paths between the components of the logging system 1200. The bus 1227 can include an address bus, a data bus, and a control bus, each independently configured. The bus 1227 can also use common conductive lines for providing one or more of address, data, or control, the use of which can be regulated by the controller 1225.

The bus 1227 can include instrumentality for a communication network. The bus 1227 can be configured such that the components of the logging system 1200 are distributed. Such distribution can be arranged between downhole components such as the measurement device 1204 and components that can be disposed on the surface of a well. Alternatively, several of these components can be co-located, such as on one or more collars of a drill string or on a wireline structure.

In various embodiments, the logging system 1200 includes peripheral devices that can include displays 1255, additional storage memory, or other control devices that may operate in conjunction with the controller 1225 or the processing unit 1202. The display 1255 can display diagnostic and measurement information for the system 1200, based on the signals generated according to embodiments described above.

In an embodiment, the controller 1225 can be fabricated to include one or more processors. The display 1255 can be fabricated or programmed to operate with instructions stored in the processing unit 1202 (for example in the memory 1206) to implement a user interface to manage the operation of the system 1200, including any one or more components distributed within the system 1200. This type of user interface can be operated in conjunction with the communications unit 1240 and the bus 1227. Various components of the system 1200 can be integrated with the BHA shown in FIGS. 2-4 and 6-9, which may in turn be used to house the Transmitters and Receivers of the measurement device 1204, such that processing identical to or similar to the methods discussed previously, and those that follow, can be conducted according to various embodiments that are described herein.

Methods

In some embodiments, a non-transitory machine-readable storage device can comprise instructions stored thereon, which, when performed by a machine, cause the machine to become a customized, particular machine that performs operations comprising one or more features similar to or identical to those described with respect to the methods and techniques described herein. A machine-readable storage device, as described herein, is a physical device that stores information (e.g., instructions, data), which when stored, alters the physical structure of the device. Examples of machine-readable storage devices can include, but are not limited to, memory 1206 in the form of read only memory (ROM), random access memory (RAM), a magnetic disk storage device, an optical storage device, a flash memory, and other electronic, magnetic, or optical memory devices, including combinations thereof.

The physical structure of stored instructions may be operated on by one or more processors such as, for example, the processing unit 1202. Operating on these physical structures can cause the machine to become a specialized machine that performs operations according to methods described herein. The instructions can include instructions to cause the processing unit 1202 to store associated data or other data in the memory 1206. The memory 1206 can store the results of measurements of formation parameters, to include gain parameters, calibration constants, identification data, sensor location information, etc. The memory 1206 can store a log of the measurement and location information provided by the system 1200. The memory 1206 therefore may include a database, for example a relational database.

Figure 13:
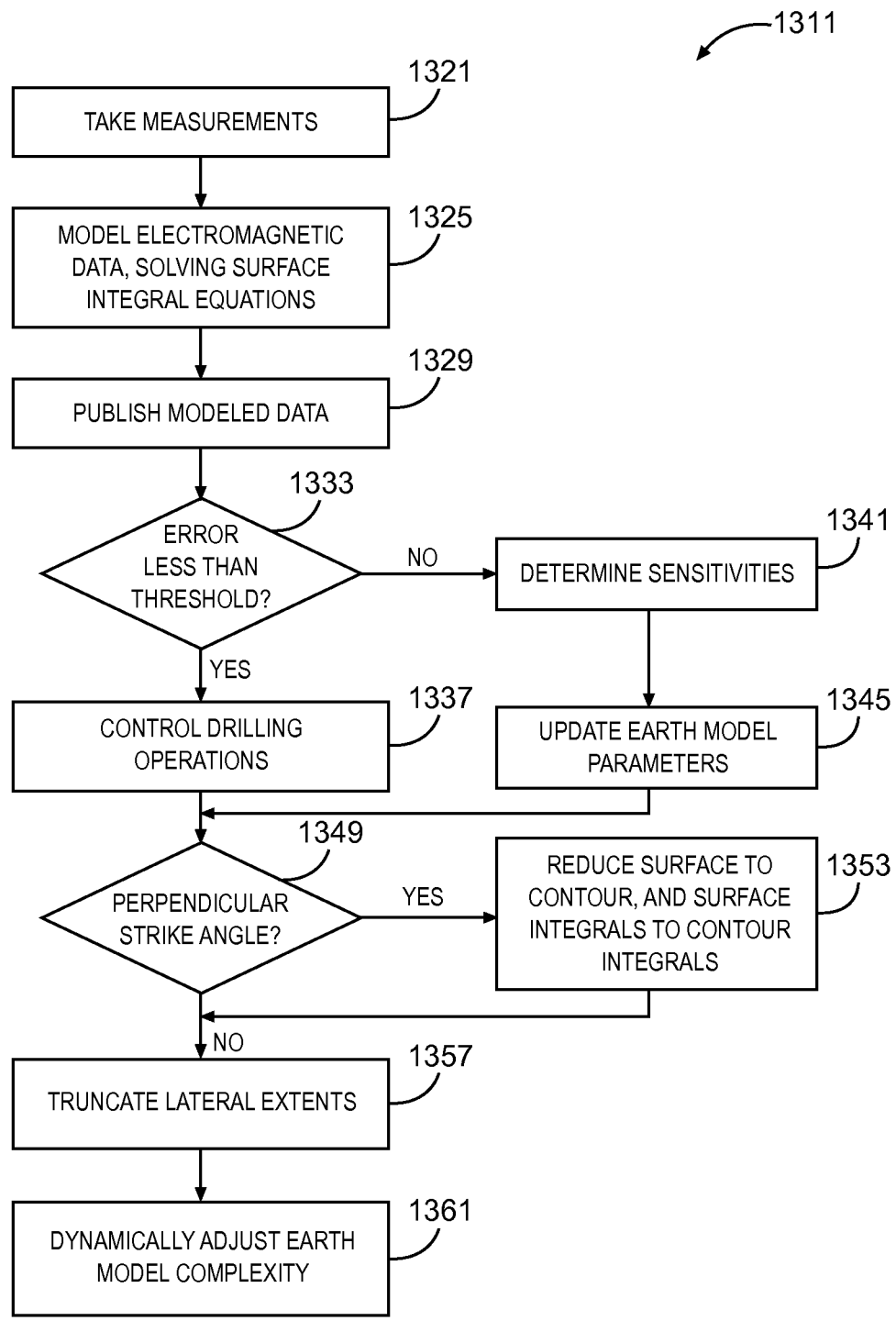
FIG. 13 is a flow diagram illustrating data acquisition, processing, and control methods, according to various embodiments of the invention.

FIG. 13 is a flow diagram illustrating data acquisition, processing, and control methods 1311, according to various embodiments of the invention. The methods 1311 described herein are with reference to the apparatus and systems shown in FIGS. 1-4, 6-9, and 12. Thus, in some embodiments, a method 1311 comprises solving a first set of surface integrals at block 1325 to determine modeled electromagnetic data in a geological formation, and then presenting some of the data in a human-readable form at block 1329. The modeled electromagnetic data may exist as a set of arbitrary surfaces, from which for example, layer resistivity can be derived by applying a transfer function.

For the purposes of this document, "publishing . . . in human-readable form" means providing information in the form of a hardcopy printout, a display, or a projection, so as to be visible to humans. Such publication may occur with respect to the display units 1255 and/or the controlled device 1270 of FIG. 12. Many embodiments may thus be realized.

For example, in some embodiments a method 1311 begins with taking measurements at block 1321. Such measurements may include resistivity LWD data, or nuclear magnetic resonance data, or acoustic data, obtained downhole, in a geological formation.

The method 1311 may continue on to block 1325 with modeling of resistivity LWD data to provide modeled resistivity LWD data by solving a first set of SIEs that include 3D earth model parameters corresponding to an 3D earth model of the geological formation.

The SIEs may be formulated in a variety of ways. For example, the SIEs can be formulated in terms of electromagnetic fields and their potentials, or in terms of equivalent electric and magnetic sources.

A variety of measurements and surfaces may be used to form the 3D earth model parameters. Thus, the earth model parameters may include formation resistivities for two or more layers, anisotropy coefficients of the layers, and a 3D surface for a boundary between the layers in the geological formation.

Surfaces bounding the layers under investigation can be described by a mesh of two-dimensional contours. Discretization can be used to form a mesh for modeling, and/or a mesh for inversion. Thus, the 3D surface between the layers may be discretized to form at least one mesh.

The contours in the mesh may be represented by splines and/or polynomial functions. Thus, the 3D earth model parameters may be defined using spatially continuous functions comprising splines, polynomial functions, or other such functions.

In some embodiments, the method 1311 may go on to include publishing at least some of the modeled resistivity LWD data in human-readable form, at block 1329.

Drilling operations (e.g., steering a drill bit) may be controlled according to when the modeled resistivity LWD matches the measured resistivity LWD data to some desired degree. The error between the two sets of data may be realized as a function, perhaps reducible to a simple difference. Thus, if it is determined that the error between the modeled resistivity LWD and measured resistivity LWD is less than a selected threshold at block 1333, the method 1311 may continue on to block 1337 to include controlling drilling operations in the geological formation based on the 3D earth model.

Formation evaluation enables geosteering, which is one of the drilling operations that can be controlled via modeling and measurement (e.g., modeling and measurement of formation resistivity). Thus, controlling the drilling operations at block 1337 may comprise operating a geosteering device to maneuver a BHA in the geological formation. In some embodiments, controlling the drilling operations at block 1337 comprises evaluating the geological formation ahead of or around the BHA. In some embodiments, controlling the drilling operations comprises operating a geosteering device to select a drilling direction in the geological formation.

When the error between measured and modeled resistivity LWD data grows to be greater than the desired degree, as determined at block 1333, resistivity LWD sensitivities are determined, by solving a second set of surface integral equations. Thus, when the error between the modeled resistivity LWD data and the measured resistivity LWD data is greater than the selected threshold, the method 1311 may continue on to include determining sensitivities as perturbations in predicted data generated by the first set of integral equations (solved at block 1325) due to perturbations in the 3D earth model parameters, by solving a second set of surface integral equations at block 1341.

Sensitivities can be determined according to a variety of methods, including perturbation methods (e.g., finite difference methods) and adjoint operator methods. Thus, the activity at block 1341 may comprise determining the sensitivities using perturbation methods or adjoint operator methods.

The determined sensitivities can be inverted to obtain revised 3D earth model parameters. Thus, the method 1311 may include, at block 1345, updating the 3D earth model parameters using the error and the sensitivities by minimizing a parametric functional that includes the linear combination of error and stabilizing functionals.

Some earth model parameters, such as those that do not contribute significantly to the determination of resistivity (e.g., those that do not have more than a selectable threshold effect), can be damped to stabilize inversion results. For the purposes of this document, "regularized" is used herein to describe a method that includes numerical regularization, which may comprise damping selected parameters. The activity of minimizing the parametric functional at block 1345 may be based on at least one of a regularized Newton, Gauss-Newton, Marquardt-Levenberg, Maximum Likelihood, Conjugate Gradient, Non-linear Conjugate Gradient, or Steepest Descent method.

Some embodiments accommodate a substantially perpendicular strike angle in the formation. Thus, the method 1311 may comprise determining that the geological formation has a strike angle approximately perpendicular to the well trajectory at block 1349, and if that is the case, may include reducing one or more three-dimensional surfaces to corresponding two-dimensional contours. The activity at block 1349 may further comprise using spatial transforms to reduce the surface integral equations (solved at block 1325) to contour integral equations.

Resistivity LWD sensitivity can be used to limit the amount of surface area that is considered when determining layer resistivity. For example, if the tool used to measure resistivity has a useful radius of measurement of five meters, the surface area included in resistivity determination may be limited to a circular area that is roughly 10 meters in diameter, centered on the resistivity measurement sensor. The truncation of lateral surface extents in this manner can be used to impose regularization. Thus, the method 1311 may include, at block 1357, truncating lateral extents of at least one surface bounding at least one layer based on a sensitivity of a resistivity LWD tool used to obtain the measured resistivity LWD data.

The complexity of the earth model may be adjusted dynamically, for example, according to the amount of change observed in the measured resistivity. Thus, when the measurements change less than a selected amount over some selected period of time, a spline representation of the surfaces that bound the layer under investigation can be changed to a piece-wise constant representation. Therefore, the method 1311 may include, at block 1361, dynamically adjusting functional complexity of the earth model associated with determining modeled formation resistivity by selecting a functional parameterization of the earth model according to range variations in resistivity measured in the formation.

It should be noted that the methods described herein (e.g., see FIGS. 5, 10, 13) do not have to be executed in the order described, or in any particular order. Moreover, various activities described with respect to the methods identified herein can be executed in iterative, serial, or parallel fashion. In some embodiments, one or more activities in one method can be substituted for one or more activities in another method. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program, to perform the methods described herein. One of ordinary skill in the art will further understand the various programming languages that may be employed to create one or more software programs designed to implement and perform the methods disclosed herein. For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those of ordinary skill in the art, such as application program interfaces or inter-process communication techniques, including remote procedure calls. The teachings of various embodiments are not limited to any particular programming language or environment. Thus, other embodiments may be realized.

Systems

Figure 14:
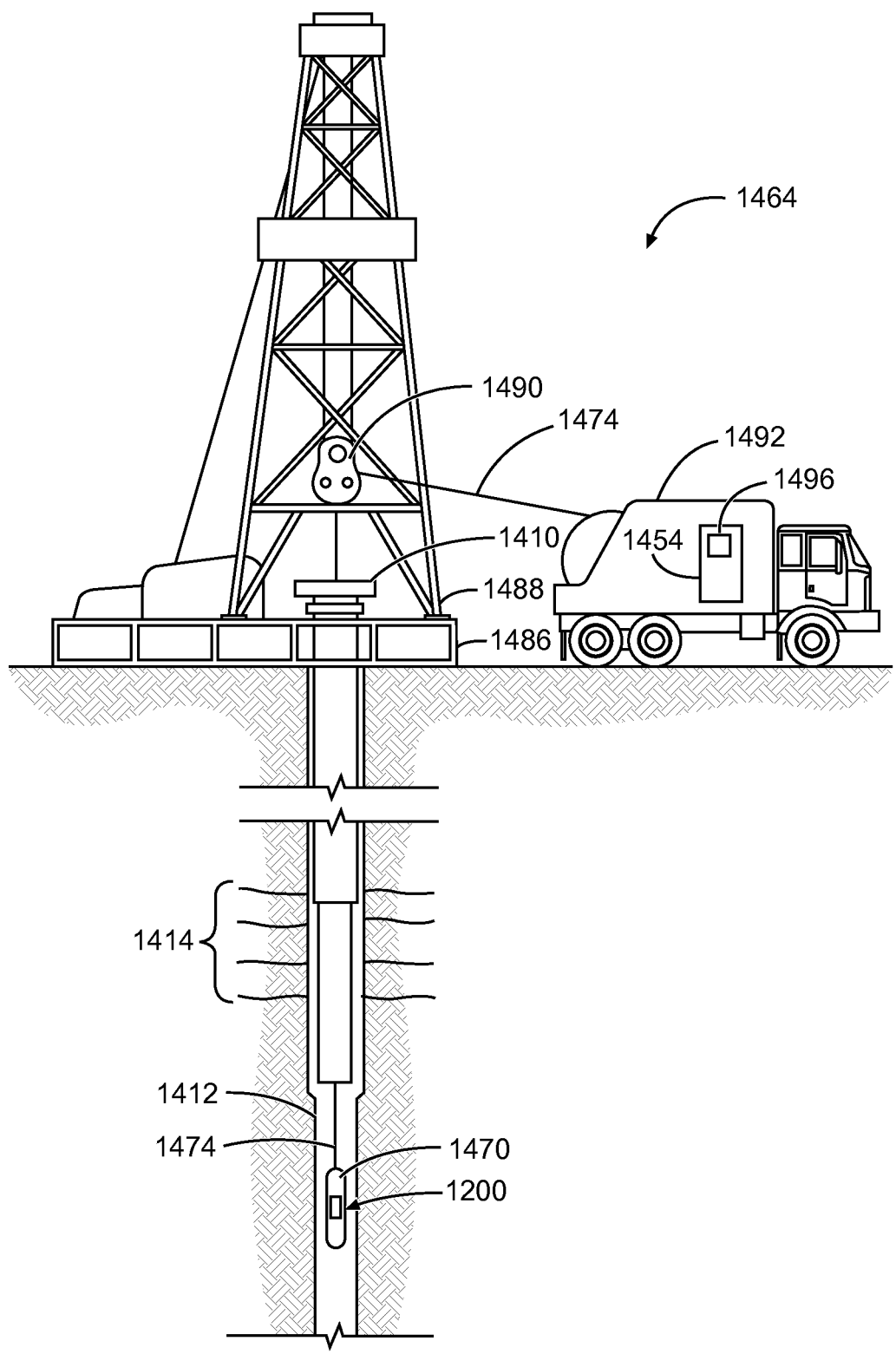
FIG. 14 depicts an example wireline system, according to various embodiments of the invention.
Figure 15:
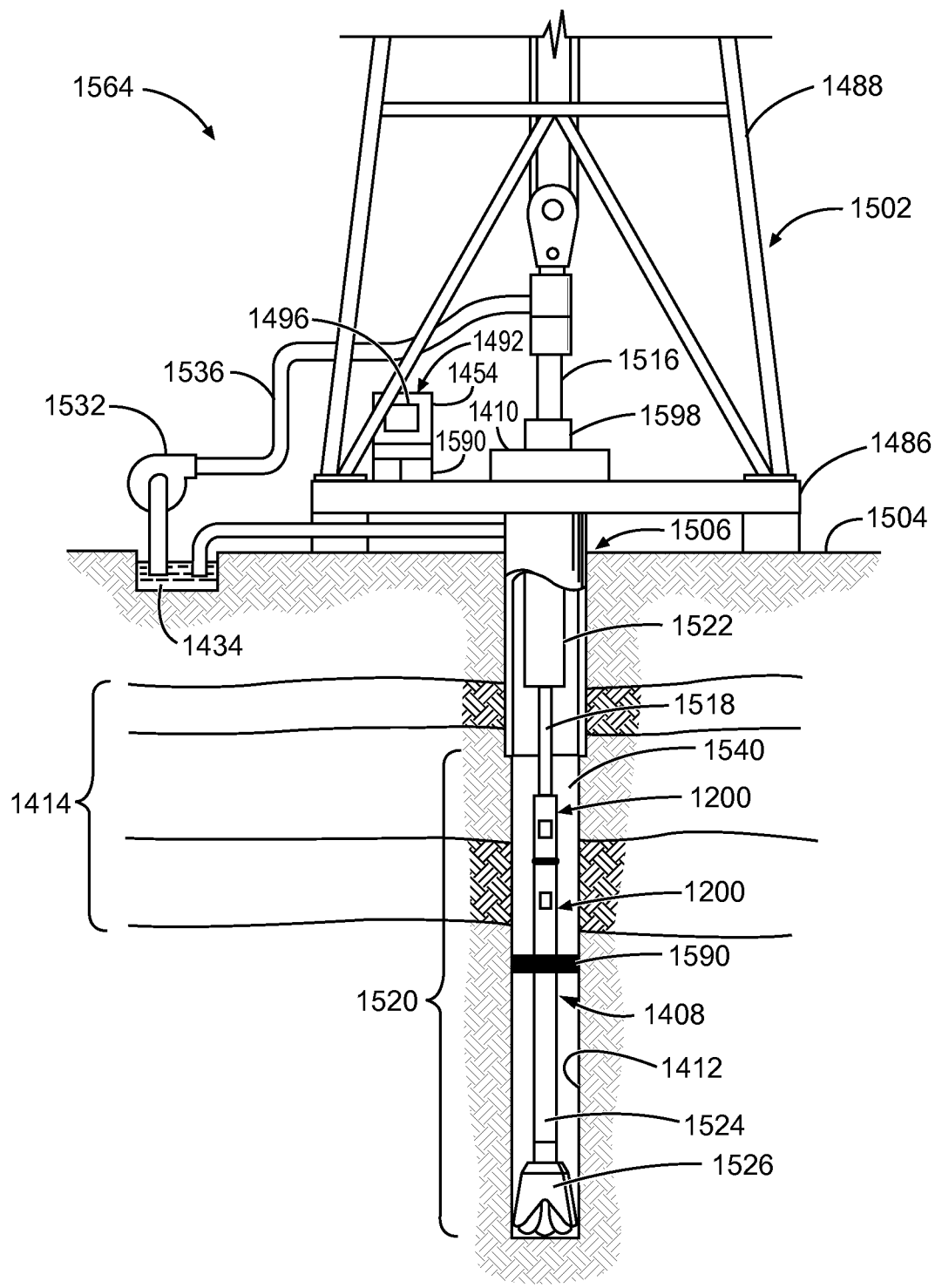
FIG. 15 depicts an example drilling rig system, according to various embodiments of the invention.

FIG. 14 depicts an example wireline system 1464, according to various embodiments of the invention. FIG. 15 depicts an example drilling rig system 1564, according to various embodiments of the invention. Either of the systems in FIG. 14 and FIG. 15 are operable to integrate or control a system 1200 to conduct measurement operations in a wellbore, and to provide images of the casing/tubing and formation surrounding the wellbore, as well as to control drilling operations. Thus, the systems 1464, 1564 may comprise portions of a wireline logging tool body 1470 as part of a wireline logging operation, or of a downhole tool 1524 (e.g., a drilling operations tool) as part of a downhole drilling operation.

Returning now to FIG. 14, a well during wireline logging operations can be seen. In this case, a drilling platform 1486 is equipped with a derrick 1488 that supports a hoist 1490.

Drilling oil and gas wells is commonly carried out using a string of drill pipes connected together so as to form a drilling string that is lowered through a rotary table 1410 into a wellbore or borehole 1412. Here it is assumed that the drilling string has been temporarily removed from the borehole 1412 to allow a wireline logging tool body 1470, such as a probe or sonde, to be lowered by wireline or logging cable 1474 into the borehole 1412. Typically, the wireline logging tool body 1470 is lowered to the bottom of the region of interest and subsequently pulled upward at a substantially constant speed.

During the upward trip, at a series of depths the instruments (e.g., portions of the system 1200 shown in FIG. 12) included in the tool body 1470 may be used to perform measurements on the subsurface geological formations adjacent the borehole 1412 (and the tool body 1470). The measurement data can be communicated to a surface logging facility 1492 for storage, processing, and analysis. The logging facility 1492 may be provided with electronic equipment for various types of signal processing, which may be implemented by any one or more of the components of the system 1200 shown in FIG. 12. Similar formation evaluation data may be gathered and analyzed during drilling operations (e.g., during LWD operations, and by extension, sampling while drilling).

In some embodiments, the tool body 1470 comprises one or more systems 1200, or elements thereof, for obtaining and communicating measurements in a subterranean formation through a borehole 1412. The tool is suspended in the wellbore by a wireline cable 1474 that connects the tool to a surface control unit (e.g., comprising a surface computer 1454, which can also include a display). The tool may be deployed in the borehole 1412 on coiled tubing, jointed drill pipe, hard wired drill pipe, or any other suitable deployment technique.

Turning now to FIG. 15, it can be seen how a system 1564 may also form a portion of a drilling rig 1502 located at the surface 1504 of a well 1506. The drilling rig 1502 may provide support for a drill string 1508. The drill string 1508 may operate to penetrate the rotary table 1410 for drilling the borehole 1412 through the subsurface formations 1414. The drill string 1508 may include a Kelly 1516, drill pipe 1518, and a bottom hole assembly 1520, perhaps located at the lower portion of the drill pipe 1518.

The bottom hole assembly 1520 may include drill collars 1522, a downhole tool 1524, and a drill bit 1526. The drill bit 1526 may operate to create the borehole 1412 by penetrating the surface 1504 and the subsurface formations 1514. The downhole tool 1524 may comprise any of a number of different types of tools including MWD tools, LWD tools, and others.

During drilling operations, the drill string 1508 (perhaps including the Kelly 1516, the drill pipe 1518, and the bottom hole assembly 1520) may be rotated by the rotary table 1410. Although not shown, in addition to, or alternatively, the bottom hole assembly 1520 may also be rotated by a motor (e.g., a mud motor) that is located downhole. The drill collars 1522 may be used to add weight to the drill bit 1526. The drill collars 1522 may also operate to stiffen the bottom hole assembly 1520, allowing the bottom hole assembly 1520 to transfer the added weight to the drill bit 1526, and in turn, to assist the drill bit 1526 in penetrating the surface 1504 and subsurface formations 1414.

During drilling operations, a mud pump 1532 may pump drilling fluid (sometimes known by those of ordinary skill in the art as "drilling mud") from a mud pit 1534 through a hose 1536 into the drill pipe 1518 and down to the drill bit 1526. The drilling fluid can flow out from the drill bit 1526 and be returned to the surface 1504 through an annular area 1540 between the drill pipe 1518 and the sides of the borehole 1412. The drilling fluid may then be returned to the mud pit 1534, where such fluid is filtered. In some embodiments, the drilling fluid can be used to cool the drill bit 1526, as well as to provide lubrication for the drill bit 1526 during drilling operations. Additionally, the drilling fluid may be used to remove subsurface formation cuttings created by operating the drill bit 1526.

In light of the foregoing discussion, it may be seen that in some embodiments, the systems 1464, 1564 may include a drill collar 1522, a downhole tool 1524, and/or a wireline logging tool body 1470 to house one or more systems 1200, including some or all of the components thereof. Thus, for the purposes of this document, the term "housing" may include any one or more of a drill collar 1522, a downhole tool 1524, or a wireline logging tool body 1470 (all having an outer wall, to enclose or attach to magnetometers, sensors, fluid sampling devices, pressure measurement devices, transmitters, receivers, fiber optic cable, acquisition and processing logic, and data acquisition systems). The tool 1524 may comprise a downhole tool, such as an LWD tool or MWD tool. The wireline tool body 1470 may comprise a wireline logging tool, including a probe or sonde, for example, coupled to a logging cable 1474. Many embodiments may thus be realized.

For example, by referring now to FIGS. 12 and 14-15, a system 1464, 1564 may be seen to comprise a downhole tool body, such as a wireline logging tool body 1470 or a downhole tool 1524 (e.g., an LWD or MWD tool body), and one or more components of the system 1200 (see FIG. 12) attached to the tool body.

In some embodiments, a system 1464, 1565 comprises at least one tool 1470, 1524 configured to measure characteristics of a geological formation 1414, such as formation resistivity. The systems 1464, 1564 may further comprise a processing unit 1202 to determine modeled resistivity LWD data, including modeled formation resistivity, in at least one layer of the geological formation 1414 by solving a first set of surface integral equations using initial or updated earth model parameters corresponding to an earth model of a geological formation. Displays units 1496 can be used to display the modeled resistivity LWD data, including the earth model parameters.

A bit steering mechanism 1590 (operating as a controlled device 1270) can be controlled by the processing unit 1202 when the measured and modeled resistivity converge to a desired degree. A transfer function can be applied to the resistivity LWD data to produce resistivity values for the formation 1414. Thus, in some embodiments, the systems 1200, 1565 comprise a bit steering mechanism 1590 to operate in response to the processing unit 1202 when error between the modeled formation resistivity and the measured formation resistivity is less than a selected threshold, to control drilling operations in the geological formation 1414 based on the earth model.

Measured data can be compressed, by fitting a spline to the data and transmitting the nodes of the spline to a remote location. Thus, in some embodiments, the processing unit 1202 is operable to fit a compression spline to data corresponding to the measured formation resistivity, and the systems 1465, 1565, comprise a telemetry transmitter (e.g., as part of the communications unit 1240) to transmit compressed resistivity data comprising nodes of the compression spline to a surface computer 1454.

In some embodiments, the system may include a monitor to display transitions between layers based on the convergence/divergence of measured and modeled resistivity. Thus, the systems 1200, 1464, 1565 may comprise a monitor (e.g., one or more display unites 1255, 1496) to indicate transitions from at least one layer to another layer in the geological formation, based on the error between the modeled formation characteristics and the measured formation characteristics, including formation resistivity.

Any of the above components, for example systems 1200, 1464, 1564 (and each of their elements) may all be characterized as "modules" herein. Such modules may include hardware circuitry, and/or a processor and/or memory circuits, software program modules and objects, and/or firmware, and combinations thereof, as desired by the architect of the apparatus and systems described herein, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, a measured radiation simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus and systems are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Thus, many other embodiments may be realized.

Various Example Embodiments of the Invention

For example, referring now to FIGS. 1-15, it can be seen that in some embodiments, a method may comprise modeling resistivity LWD data to provide modeled resistivity LWD data by solving a first set of surface integral equations that include earth model parameters corresponding to an earth model of a geological formation, and publishing at least some of the modeled electromagnetic data in human-readable form.

In some embodiments, the method may comprise controlling drilling operations in the geological formation based on the 3D earth model, when error between the modeled electromagnetic (e.g., resistivity LWD) data and measured electromagnetic (e.g., resistivity LWD) data is less than a selected threshold. Controlling the drilling operations may comprise operating a geosteering device to maneuver a bottom hole assembly in the geological formation, evaluating the geological formation ahead of or around the bottom hole assembly, and/or operating a geosteering device to select a drilling direction in the geological formation.

In some embodiments of the method, the surface integral equations are formulated in terms of electromagnetic fields and electromagnetic field potentials, or in terms of equivalent sources.

In some embodiments of the method, the earth model parameters include formation resistivities of at least two layers, anisotropy coefficients of the at least two layers, and a three-dimensional surface of at least one boundary between the at least two layers in the geological formation.

In some embodiments, the method may comprise determining the geological formation has a strike angle approximately perpendicular to the well trajectory, reducing the at least one three-dimensional surface to a two-dimensional contour, and using spatial transforms to reduce the surface integral equations to contour integral equations. In some embodiments of the method, the three-dimensional surface is discretized to form at least one mesh.

In some embodiment of the method, the earth model parameters are each defined using spatially continuous functions comprising splines or polynomial functions.

Some embodiments of the method comprise determining sensitivities as perturbations in predicted data generated by the first set of integral equations due to perturbations in the 3D earth model parameters by solving a second set of surface integral equations, when the error between the modeled electromagnetic (e.g., resistivity LWD) data and the measured electromagnetic (e.g., resistivity LWD) data is greater than the selected threshold. In some embodiments of the method, the sensitivities are determined using perturbation methods or adjoint operator methods.

Some embodiments of the method may comprise updating the 3D earth model parameters using the error and the sensitivities by minimizing a parametric functional that includes the linear combination of the error and stabilizing functionals. In some embodiments of the method, minimizing the parametric functional is based on at least one of a regularized Newton, Gauss-Newton, Marquardt-Levenberg, Maximum Likelihood, Conjugate Gradient, or Steepest Descent method.

Some embodiments of the method comprise truncating lateral extents of at least one surface bounding at least one layer based on a tool sensitivity of a tool used to obtain the measured electromagnetic (e.g., resistivity LWD) data.

Some embodiments of the method comprise dynamically adjusting functional complexity of the earth model associated with determining modeled formation resistivity by selecting a functional parameterization of the earth model according to range variations in resistivity measured in the formation.

Some embodiments take the form of a system. Thus, in some embodiments, such a system may comprise at least one tool configured to measure resistivity in a geological formation as measured formation resistivity, and a processing unit to determine modeled electromagnetic data, including modeled formation resistivity, in at least one layer of the geological formation by solving a first set of surface integral equations using initial or updated earth model parameters corresponding to an earth model of a geological formation.

In some embodiments, the system comprises a bit steering mechanism to operate in response to the processing unit when error between the modeled formation electromagnetic data (e.g., resistivity) and the measured formation electromagnetic data (e.g., resistivity) is less than a selected threshold, to control drilling operations in the geological formation based on the earth model.

In some embodiments of the system, the processing unit is operable to fit a compression spline to data corresponding to the measured formation resistivity, and the system comprises a telemetry transmitter (e.g., mud pulse, electromagnetic telemetry, or otherwise) to transmit compressed electromagnetic (e.g., resistivity) data comprising nodes of the compression spline to a surface computer.

Some embodiments of the system comprise one or more monitors to indicate transitions from at least one layer to another layer in the geological formation, based on the error between measured and modeled formation characteristics, such as between the modeled formation resistivity and the measured formation resistivity.

In summary, using the apparatus, systems, and methods disclosed herein may reduce or eliminate artifacts that arise when state-of-the-art inversion methods are used, usually due to point-by-point inversion of resistivity LWD data evaluated from 1D earth models.

In this document, the 1D earth models are replaced with 3D earth models. However, unlike other 3D voxel-based resistivity LWD modeling and inversion attempts, discretization of the formation volume is avoided. Instead, only layer surfaces are discretized, reducing the 3D modeling problem to surface integral equations. Moreover, the sensitivities of the surface depths can be evaluated directly, enabling direct inversion of the surface geometries. In addition, the sensitivities are not computed using a finite-difference of two forward models, but rather using sensitivity equations with forms analogous to those for modeling the resistivity LWD responses. This approach can collapse the number of model parameters required to describe the earth model, and thus create an efficient method of modeling and inverting resistivity LWD data.

2D discretization of a 2D earth model into pixels can be avoided by using 1D functional representations. 3D discretization of a 3D earth model into voxels can be avoided by using 2D functional representations. More efficient 3D EM modeling of 2D or 3D earth models can be obtained for wireline and LWD tools, so that real-time operation, to include real-time inversion of resistivity wireline or LWD data, is possible. These advantages can significantly enhance the value of the services provided by an operation/exploration company, helping to reduce time-related costs, and providing greater return on investment.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Although specific embodiments have been illustrated and described herein, it will be appreciated by those of ordinary skill in the art that any arrangement that is calculated to achieve the same purpose may be substituted for the specific embodiments shown. Various embodiments use permutations or combinations of embodiments described herein. It is to be understood that the above description is intended to be illustrative, and not restrictive, and that the phraseology or terminology employed herein is for the purpose of description. Combinations of the above embodiments and other embodiments will be apparent to those of ordinary skill in the art upon studying the above description.

What is claimed is:

1. A method, comprising:
    modeling electromagnetic measurements of a geologic formation, wherein modeling the electromagnetic measurements comprises parameterizing an earth model of the geologic formation into surfaces that define interfaces between formation layers based on the electromagnetic measurements and discretizing the surfaces using splines for modeling and splines for inversion;
    calculating resistivity sensitivities using a first set of surface integral equations that include earth model parameters corresponding the surfaces, without voxel-based discretization of the surfaces; and
    updating the earth model parameters using the resistivity sensitivities to obtain revised earth model parameters.

2. The method of claim 1, further comprising:
    controlling drilling operations in the geological formation based on the earth model when error between the modeled electromagnetic measurements and the electromagnetic measurements is less than a selected threshold.

3. The method of claim 1, wherein the surface integral equations are formulated in terms of electromagnetic fields and electromagnetic field potentials, or in terms of equivalent electromagnetic sources.

4. The method of claim 1, wherein the earth model parameters include formation resistivities of at least two layers, anisotropy coefficients of the at least two layers, and a three-dimensional surface of at least one boundary between the at least two layers in the geological formation.

5. The method of claim 1, further comprising:
    determining the geological formation has a strike angle approximately perpendicular to a well trajectory;
    reducing the at least one three-dimensional surface to a two-dimensional contour; and
    using spatial transforms to reduce the surface integral equations to contour integral equations.

6. The method according to claim 4, wherein the three-dimensional surface is discretized to form at least one mesh.

7. The method of claim 1, wherein the earth model parameters are each defined using spatially continuous functions comprising splines or polynomial functions.

8. The method of claim 1, further comprising:
    determining the sensitivities as perturbations in predicted data generated by the first set of surface integral equations due to perturbations in the earth model parameters by solving a second set of surface integral equations when the error between the modeled electromagnetic measurements and the electromagnetic measurements is greater than the selected threshold.

9. The method according to claim 8, wherein the sensitivities are determined using perturbation methods or adjoint operator methods.

10. The method according to claim 8, further comprising:
    updating the earth model parameters using the error and the sensitivities by minimizing a parametric functional that includes the linear combination of the error and stabilizing functionals.

11. The method according to claim 10, wherein minimizing the parametric functional is based on at least one of a regularized Newton, Gauss-Newton, Marquardt-Levenberg, Maximum Likelihood, Conjugate Gradient, or Steepest Descent method.

12. The method according to claim 1, further comprising:
truncating lateral extents of at least one surface bounding at least one layer based on a tool sensitivity of a tool used to obtain the electromagnetic measurements.

13. The method according to claim 2, wherein controlling the drilling operations comprises:
operating a geosteering device to maneuver a bottom hole assembly in the geological formation.

14. The method according to claim 13, wherein controlling the drilling operations comprises:
evaluating the geological formation ahead of or around the bottom hole assembly.

15. The method according to claim 2, wherein controlling the drilling operations comprises:
operating a geosteering device to select a drilling direction in the geological formation.

16. The method of claim 1, further comprising:
dynamically adjusting functional complexity of the earth model associated with determining modeled formation resistivity by selecting a functional parameterization of the earth model according to range variations in resistivity measured in the formation.

17. A system, comprising:
at least one measurement device configured to measure resistivity in a geological formation as measured formation resistivity, wherein the measurement device comprises at least one transmitter and/or receiver;
a processing unit coupled to the at least one measurement device to receive the measured formation resistivity, the processing unit to provide determined modeled electromagnetic data, including modeled formation resistivity, in at least one layer of the geological formation by parameterizing an earth model of the geological formation into surfaces that define interfaces between formation layers based on the measured formation resistivity, discretizing the surfaces using splines for modeling and splines for inversion, and solving a first set of surface integral equations using initial or updated earth model parameters corresponding to the earth model of a geological formation; and
a bottom hole assembly configured to be controlled by a controller, according to the determined modeled electromagnetic data.

18. The system according to claim 17, further comprising:
a bit steering mechanism to operate in response to the processing unit when error between the modeled formation resistivity and the measured formation resistivity is less than a selected threshold, to control drilling operations in the geological formation based on the earth model.

19. The system of claim 17, wherein the processing unit is to fit a compression spline to data corresponding to the measured formation resistivity, further comprising:
a telemetry transmitter to transmit compressed resistivity data comprising nodes of the compression spline to a surface computer.

20. The system according to claim 18, further comprising:
a monitor to indicate transitions from at least one layer to another layer in the geological formation, based on the error.

* * * * *